(12) United States Patent
Marx et al.

(10) Patent No.: US 12,347,968 B2
(45) Date of Patent: Jul. 1, 2025

(54) LOCKING MECHANISM FOR A BATTERY PACK ON A PORTABLE ELECTRIC DEVICE

(71) Applicant: MILWAUKEE ELECTRIC TOOL CORPORATION, Brookfield, WI (US)

(72) Inventors: John G. Marx, Hartford, WI (US); Kyle J. Radovich, West Bend, WI (US); Jeffrey M. Wackwitz, Waukesha, WI (US); Andrew D. Van Hoorn, Menomonee Falls, WI (US); Joseph R. Beeson, Kansas City, MO (US); Troy C. Thorson, Cedarburg, WI (US); Nathan Bandy, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 219 days.

(21) Appl. No.: 18/069,564

(22) Filed: Dec. 21, 2022

(65) Prior Publication Data
US 2023/0208077 A1     Jun. 29, 2023

Related U.S. Application Data

(63) Continuation of application No. 16/816,370, filed on Mar. 12, 2020, now Pat. No. 11,539,163.

(60) Provisional application No. 62/817,034, filed on Mar. 12, 2019.

(51) Int. Cl.
*H01R 13/627* (2006.01)
*H01M 50/20* (2021.01)
(Continued)

(52) U.S. Cl.
CPC ........ *H01R 13/6272* (2013.01); *H01M 50/20* (2021.01); *H01M 50/204* (2021.01);
(Continued)

(58) Field of Classification Search
CPC .. H01R 13/6272; H01R 13/04; H01R 13/422; H01R 13/428; H01R 13/62955;
(Continued)

(56) References Cited

U.S. PATENT DOCUMENTS 3,186,878 A    6/1965  Filander
3,999,110 A   12/1976  Ramstrom et al.
(Continued)

FOREIGN PATENT DOCUMENTS

CN    104925211 A    9/2015
CN    105148253 A   12/2015
(Continued)

OTHER PUBLICATIONS

International Search Report and Written Opinion for Application No. PCT/US2020/022225 dated Jul. 2, 2020 (9 pages).
(Continued)

*Primary Examiner* — Justin M Kratt
(74) *Attorney, Agent, or Firm* — Michael Best & Friedrich LLP

(57) ABSTRACT

A power tool including a housing that has a battery pack receiving portion configured to receive an interface of a battery pack, device contacts extending from the housing and configured to mechanically and electrically engage with the battery pack, and a latching mechanism supported by the housing and including an actuator and a latch member configured to selectively engage the interface of the battery pack. The actuator is pivotable to operatively pivot the latch member.

20 Claims, 20 Drawing Sheets

(51) Int. Cl.
*H01M 50/204* (2021.01)
*H01M 50/247* (2021.01)
*H01M 50/262* (2021.01)
*H01R 13/04* (2006.01)
*H01R 13/422* (2006.01)
*H01R 13/428* (2006.01)
*H01R 13/629* (2006.01)
*H01R 13/639* (2006.01)
*H02J 7/00* (2006.01)
*B25F 5/02* (2006.01)
*H01M 50/209* (2021.01)
*H01M 50/213* (2021.01)
*H01R 13/426* (2006.01)
*H01R 13/432* (2006.01)

(52) U.S. Cl.
CPC ....... *H01M 50/247* (2021.01); *H01M 50/262* (2021.01); *H01R 13/04* (2013.01); *H01R 13/422* (2013.01); *H01R 13/428* (2013.01); *H01R 13/62955* (2013.01); *H01R 13/639* (2013.01); *H02J 7/00045* (2020.01); *H02J 7/0042* (2013.01); *B25F 5/02* (2013.01); *H01M 50/209* (2021.01); *H01M 50/213* (2021.01); *H01M 2220/30* (2013.01); *H01R 13/4223* (2013.01); *H01R 13/426* (2013.01); *H01R 13/432* (2013.01); *H01R 13/627* (2013.01); *H01R 13/6271* (2013.01); *H02J 7/0045* (2013.01); *Y02E 60/10* (2013.01)

(58) Field of Classification Search
CPC .............. H01R 13/639; H01R 13/4223; H01R 13/426; H01R 13/432; H01R 13/627; H01R 13/6271; H01M 50/20; H01M 50/204; H01M 50/247; H01M 50/262; H01M 50/209; H01M 50/213; H01M 2220/30; H02J 7/00045; H02J 7/0042; H02J 7/0045; B25F 5/02; Y02E 60/10
See application file for complete search history.

(56) References Cited

U.S. PATENT DOCUMENTS

| | | | |
|---|---|---|---|
| 5,350,312 A | 9/1994 | Kuno et al. | |
| 5,589,288 A | 12/1996 | Coulson et al. | |
| 5,663,011 A | 9/1997 | Bunyea et al. | |
| 5,718,985 A | 2/1998 | Bunyea et al. | |
| 5,800,940 A | 9/1998 | Bunyea et al. | |
| 6,057,608 A | 5/2000 | Bailey, Jr. et al. | |
| 6,168,881 B1 | 1/2001 | Fischer et al. | |
| 6,181,032 B1 | 1/2001 | Marshall et al. | |
| 6,223,835 B1 | 5/2001 | Habedank et al. | |
| 6,304,058 B2 | 10/2001 | Watson et al. | |
| 6,329,788 B1 | 12/2001 | Bailey, Jr. et al. | |
| 6,357,533 B1 | 3/2002 | Buchholz et al. | |
| 6,412,572 B2 | 7/2002 | Habedank et al. | |
| 6,515,451 B2 | 2/2003 | Watson et al. | |
| 6,653,815 B2 | 11/2003 | Watson et al. | |
| 6,996,909 B1 | 2/2006 | Buck et al. | |
| 7,005,831 B2 | 2/2006 | Watson et al. | |
| 7,160,132 B2 | 1/2007 | Phillips et al. | |
| 7,343,683 B2 | 3/2008 | Buck et al. | |
| 7,413,460 B2 | 8/2008 | Matthias et al. | |
| 7,423,407 B2 | 9/2008 | Watson et al. | |
| 7,453,234 B2 | 11/2008 | Phillips et al. | |
| 7,455,544 B2 | 11/2008 | Glauning et al. | |
| 7,554,287 B2 | 6/2009 | Duesselberg | |
| 7,598,705 B2 | 10/2009 | Watson et al. | |
| 7,648,383 B2 | 1/2010 | Matthias et al. | |
| 7,671,562 B2 | 3/2010 | Roehm et al. | |
| 7,858,219 B2 | 12/2010 | Agehara et al. | |
| D642,119 S | 7/2011 | Baetica et al. | |
| 7,999,507 B2 | 8/2011 | Heinzen | |
| 8,189,043 B2 | 5/2012 | Schneider et al. | |
| 8,251,157 B2 | 8/2012 | Gray et al. | |
| 8,274,273 B2 | 9/2012 | Nguyen et al. | |
| 8,429,885 B2 | 4/2013 | Rosa et al. | |
| 8,443,913 B2 | 5/2013 | Nagasaka et al. | |
| 8,557,427 B2 | 10/2013 | Matsumoto | |
| 8,653,786 B2 | 2/2014 | Baetica et al. | |
| 8,659,652 B2 | 2/2014 | Schneider et al. | |
| 8,679,665 B2 | 3/2014 | Heinzen et al. | |
| 8,851,200 B2 | 10/2014 | Gray et al. | |
| 8,988,522 B2 | 3/2015 | Schneider et al. | |
| 9,010,815 B2 | 4/2015 | Cooper | |
| 9,034,505 B2 | 5/2015 | Detry et al. | |
| 9,050,715 B2 | 6/2015 | Umemura et al. | |
| 9,172,115 B2 | 10/2015 | Kolden et al. | |
| 9,196,881 B2 | 11/2015 | Gray et al. | |
| 9,263,715 B2 | 2/2016 | Hamano et al. | |
| 9,385,352 B2 | 7/2016 | Nguyen et al. | |
| 9,461,281 B2 | 10/2016 | Wackwitz et al. | |
| 9,553,297 B2 | 1/2017 | Kolden et al. | |
| 9,660,231 B2 | 5/2017 | Yoon | |
| 9,664,808 B2 | 5/2017 | Nguyen et al. | |
| 9,687,253 B2 | 6/2017 | Detry et al. | |
| 9,693,024 B2 | 6/2017 | Schneider et al. | |
| 9,696,362 B2 | 7/2017 | Nguyen et al. | |
| 9,713,880 B2 | 7/2017 | Haneda et al. | |
| 9,716,257 B2 | 7/2017 | Kong et al. | |
| 9,756,783 B2 | 9/2017 | Nojiri et al. | |
| 9,786,877 B2 | 10/2017 | Umemura et al. | |
| 9,986,212 B2 | 5/2018 | Schneider et al. | |
| 10,074,847 B2 | 9/2018 | Kolden et al. | |
| 10,076,833 B2 | 9/2018 | Tada et al. | |
| 10,079,453 B2 | 9/2018 | Nie et al. | |
| 2007/0173090 A1 | 7/2007 | Johnson et al. | |
| 2008/0187822 A1 | 8/2008 | Breitenbach | |
| 2008/0211327 A1 | 9/2008 | Schlegel et al. | |
| 2009/0266042 A1 | 10/2009 | Wade et al. | |
| 2011/0116861 A1 | 5/2011 | Zhang et al. | |
| 2012/0251229 A1 | 10/2012 | Liang et al. | |
| 2014/0147718 A1 | 5/2014 | Furui et al. | |
| 2014/0326477 A1 | 11/2014 | Thorson et al. | |
| 2016/0359151 A1 | 12/2016 | Beyerl et al. | |
| 2017/0025650 A1 | 1/2017 | Altenburger et al. | |
| 2017/0187013 A1 | 6/2017 | De Paoli et al. | |
| 2017/0271632 A1 | 9/2017 | Jenkins et al. | |
| 2017/0373288 A1 | 12/2017 | Klee et al. | |
| 2018/0108884 A1* | 4/2018 | Chen .................. H01M 50/213 |
| 2018/0169851 A1* | 6/2018 | Radovich .................. B25F 5/02 |
| 2018/0331335 A1 | 11/2018 | Klee et al. | |
| 2019/0006980 A1 | 1/2019 | Sheeks et al. | |

FOREIGN PATENT DOCUMENTS

| | | |
|---|---|---|
| CN | 105206772 A | 12/2015 |
| CN | 205148253 U | 4/2016 |
| CN | 205497393 U | 8/2016 |
| CN | 106252550 A | 12/2016 |
| DE | 20116741 U1 | 1/2002 |
| DE | 202011105614 U1 | 1/2012 |
| DE | 102014205216 A1 | 3/2015 |
| DE | 102014217992 A1 | 3/2016 |
| EP | 2000266 A1 | 12/2008 |
| EP | 2875910 A1 | 5/2015 |
| EP | 3263289 A1 | 1/2018 |
| JP | 86273466 U | 5/1987 |
| WO | 2017108317 A1 | 6/2017 |
| WO | 2017148739 A1 | 9/2017 |
| WO | 2018036123 A1 | 3/2018 |
| WO | 2018234355 A1 | 12/2018 |

OTHER PUBLICATIONS

Japanese Patent Office Action for Application No. 2021-552980 dated Oct. 18, 2022 (6 pages including English translation).
Extended European Search Report for Application No. 20770200.2 dated May 16, 2023 (8 pages).

(56) References Cited

OTHER PUBLICATIONS

Chinese Patent Office Action for Application No. 202080020900.6 dated Jan. 4, 2023 (19 pages including English translation).

* cited by examiner

LOCKING MECHANISM FOR A BATTERY PACK ON A PORTABLE ELECTRIC DEVICE

CROSS-REFERENCE TO RELATED APPLICATIONS

This application is a continuation of U.S. patent application Ser. No. 16/816,370, filed Mar. 12, 2020, now U.S. Pat. No. 11,539,163, which claims the benefit of U.S. Provisional Patent Application No. 62/817,034, filed Mar. 12, 2019, the entire content of each of which is hereby incorporated by reference.

FIELD OF INVENTION

The present invention relates to electric devices (e.g., power tools) and battery for use with electric devices.

Conventional power tool interfaces often suffer from two problems. The first problem is wear that results from repeatedly coupling a mating battery pack interface and vibration between the power tool interface and the battery pack interface. The second problem is vibration between the power tool interface and the battery pack interface. Unwanted vibration often results when the connection between the power tool and the battery pack is not sufficient, such as when a latch of either the power tool or the battery pack that is poorly connected to the other of the power tool or the battery pack while in use.

SUMMARY

In one embodiment a power tool includes a housing that has a battery pack receiving portion configured to receive an interface of a battery pack, device contacts extending from the housing and configured to mechanically and electrically engage with the battery pack, and a latching mechanism with an actuator pivotably coupled to the housing about a first pivot axis, and a latch member pivotably coupled to the housing about a second pivot axis. The latch member is configured to selectively engage the interface of the battery pack, and the actuator is configured to pivot about the first pivot axis to selectively pivot the latch member about the second pivot axis.

In another embodiment, a power tool includes a housing that has a battery pack receiving portion configured to receive an interface of a battery pack, device contacts extending from the housing and configured to mechanically and electrically engage with the battery pack, and a latching mechanism supported by the housing and including an actuator and a latch member configured to selectively engage the interface of the battery pack. The actuator is pivotable to operatively pivot the latch member.

In another embodiment, a power tool includes a housing including a cavity configured to receive an interface of a battery pack. The cavity is defined by a lower surface, a pair of sidewalls, and an end wall and a rail is disposed on each side wall. A reinforcement member is permanently coupled to each rail and is formed of a metal material. The power tool further includes device contacts supported on the end wall and configured to mechanically and electrically engage with the battery pack and a latching mechanism supported by the housing and including an actuator and a latch member configured to selectively engage the interface of the battery pack. The actuator is pivotable to operatively pivot the latch member.

Other aspects of the invention will become apparent by consideration of the detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1A:
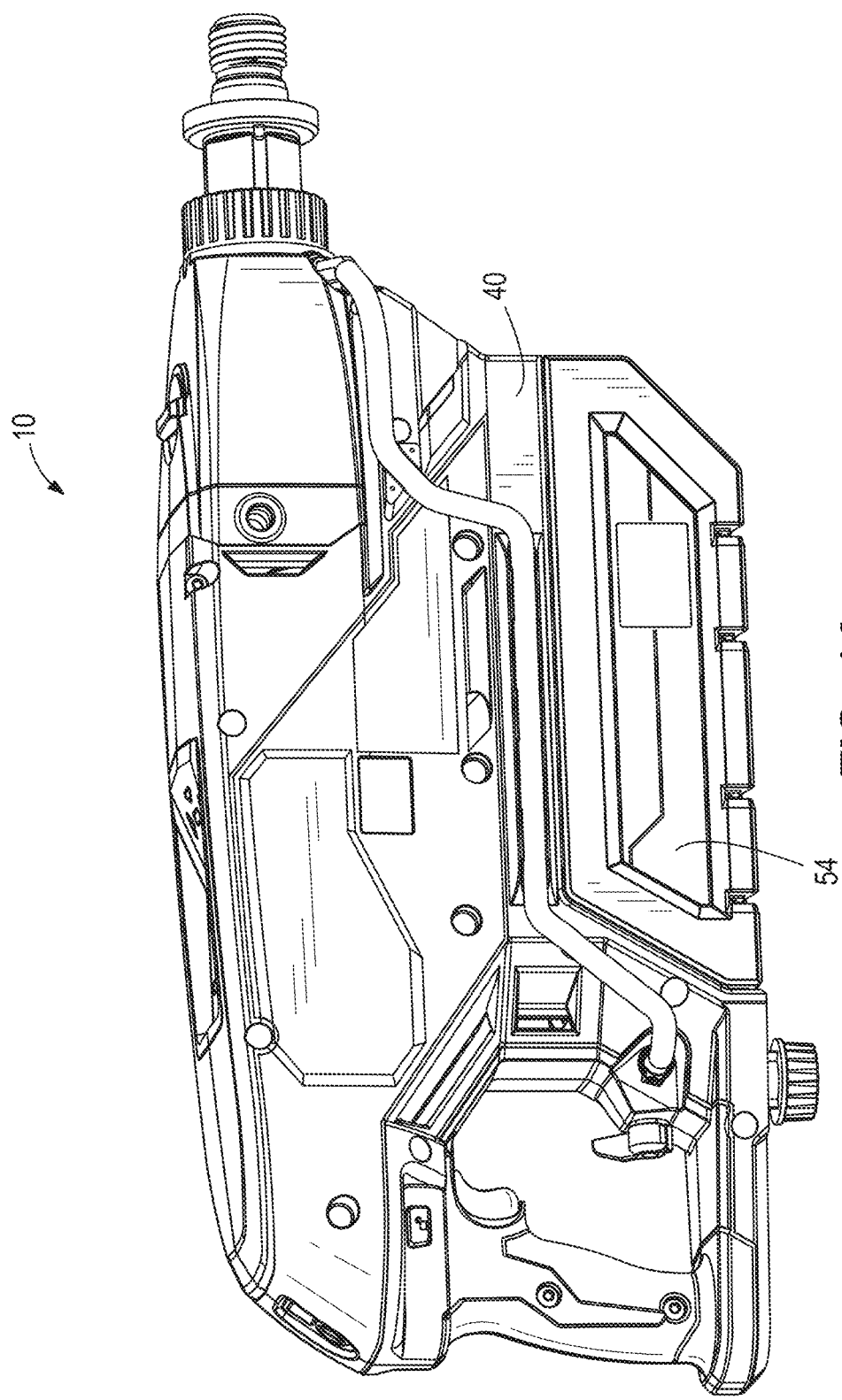
FIG. 1A is a side view of a battery pack coupled to an electric device.
Figure 1B:
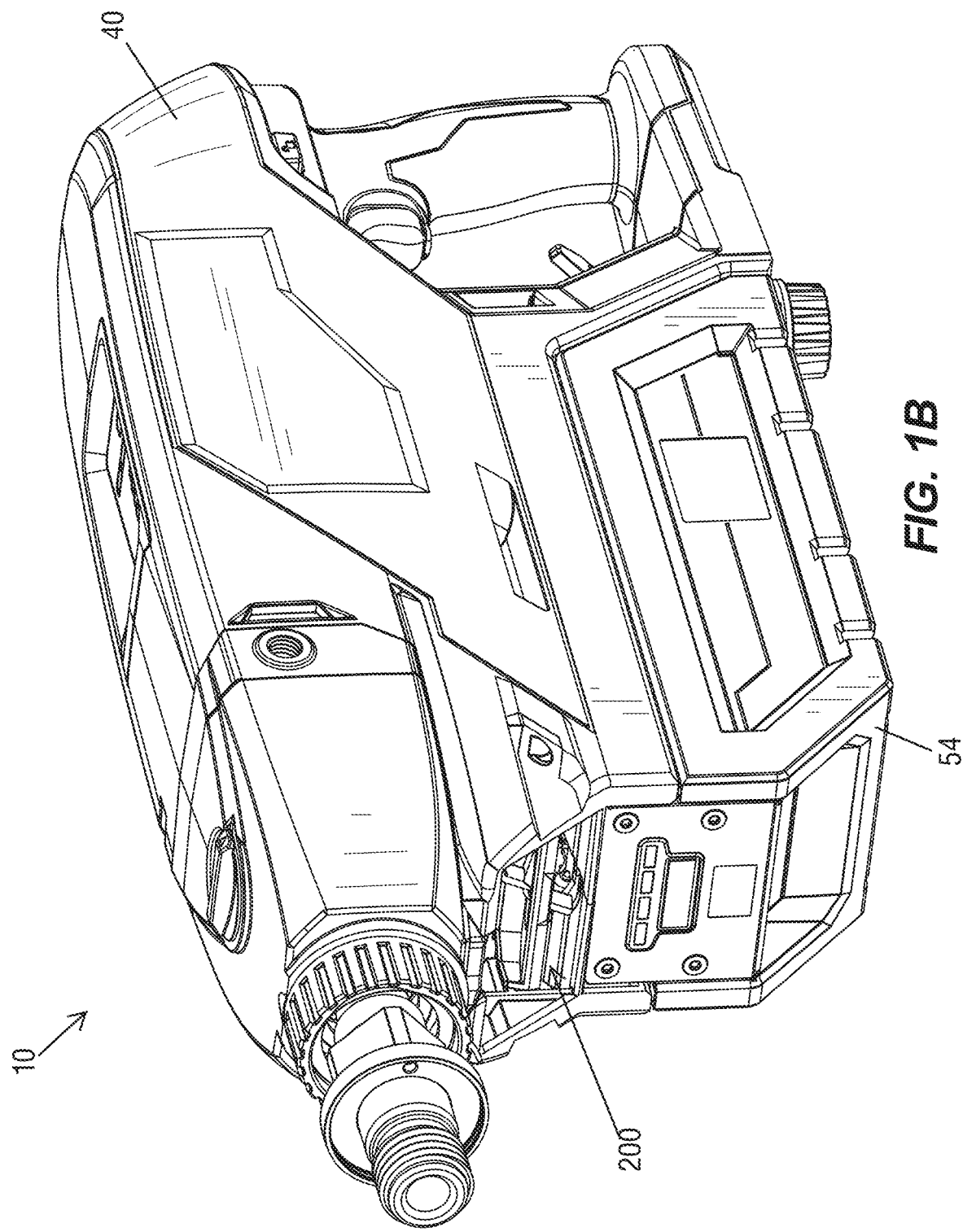
FIG. 1B is a perspective view of the battery pack and electric device of FIG. 1A.
Figure 1C:
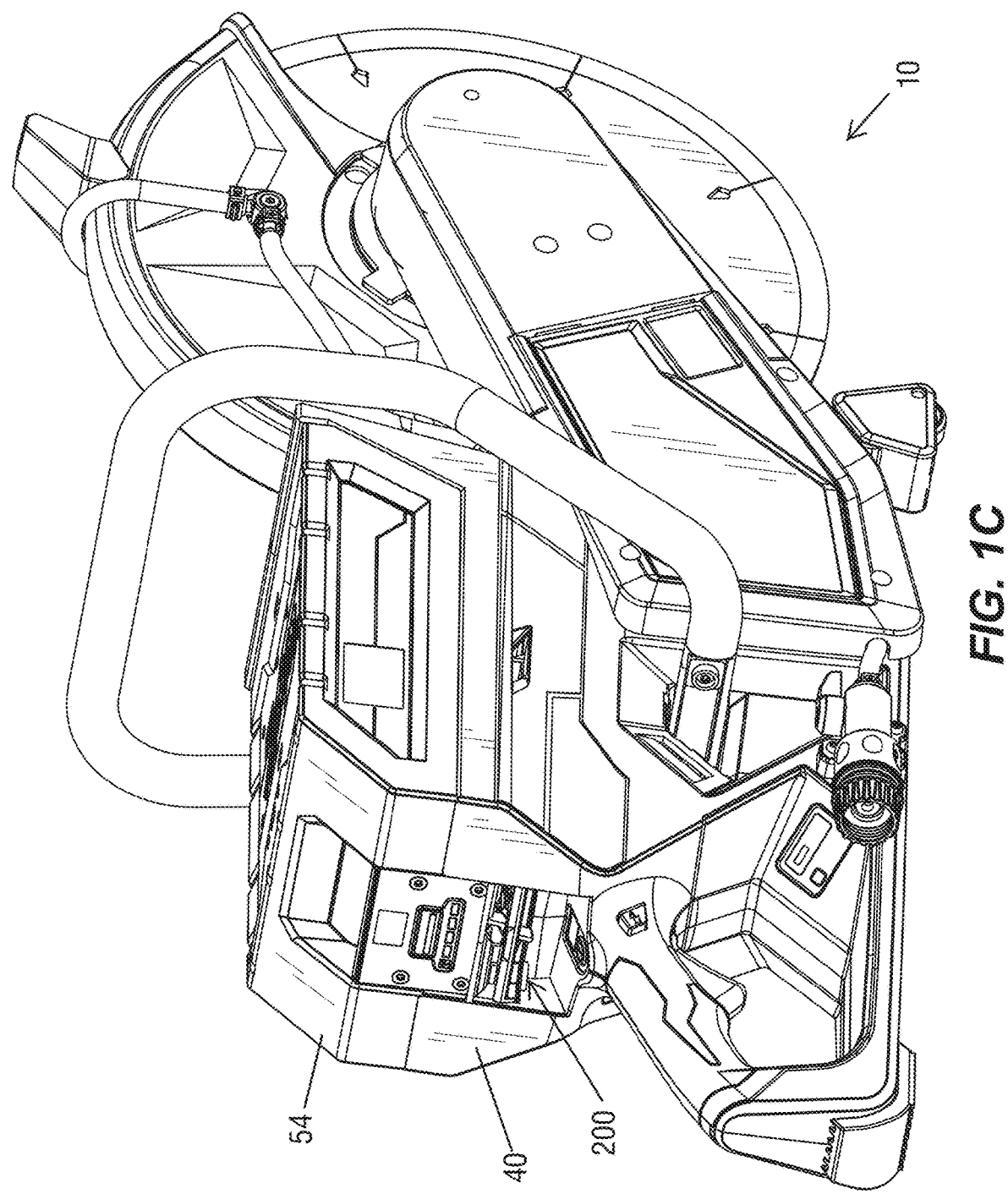
FIG. 1C is a perspective view of another battery pack and another electric device.
Figure 1D:
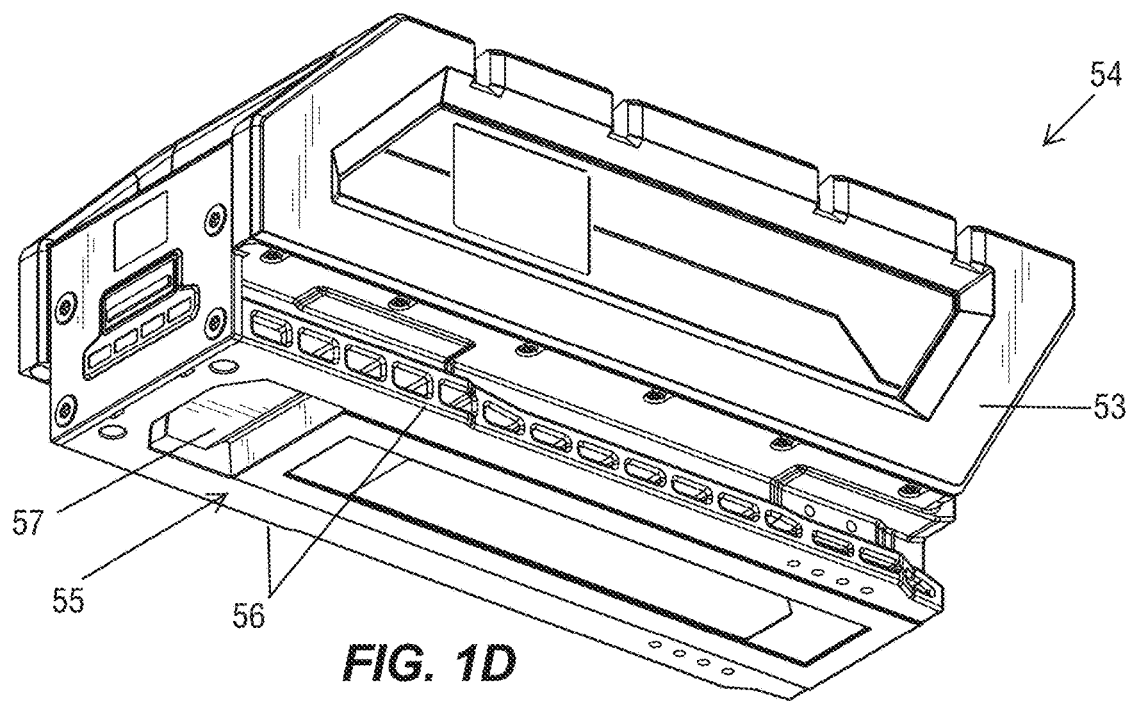
FIG. 1D is a perspective view of the battery pack of FIG. 1A.
Figure 1E:
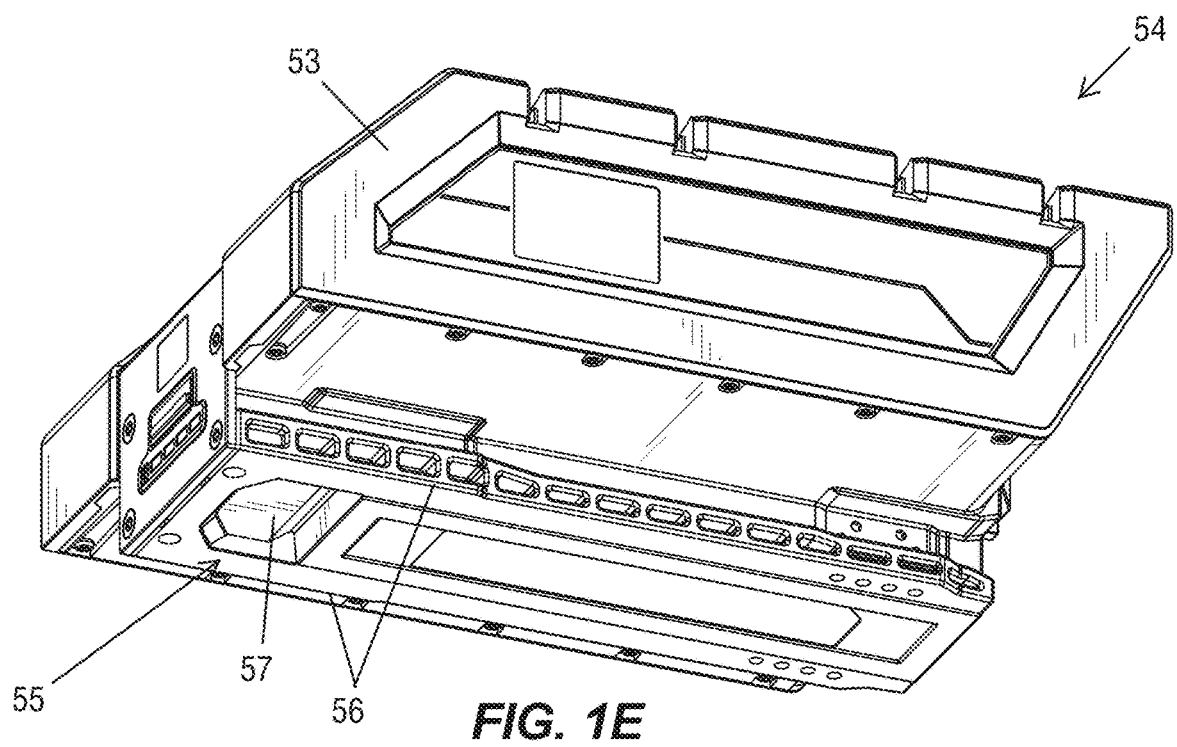
FIG. 1E is a perspective view of the battery pack of FIG. 1C.

FIGS. 1A-1C illustrate an electric device 10 configured to receive a battery pack 54 (e.g., a rechargeable lithium-ion battery pack). In the illustrated embodiment, the electric device 10 is a power tool. The electric device 10 may be any type of power tool, outdoor tool, or non-motorized device (e.g., a light, an audio device, etc.). In the embodiment of FIGS. 1A and 1B the power tool 10 is a drill. In the embodiment of FIG. 1C, the power tool 10 is a circular saw. As shown in FIGS. 1D-1E, the battery pack 54 includes a housing 53 and an interface 55. The interface 55 includes rails 56 extending along opposite sides thereof and a recess 57. The power tools 10 of FIGS. 1A-1C are configured to receive either of the battery packs 54 shown in FIGS. 1D and 1E, which have the same interface 55, but different housing 53 sizes and power ratings. Accordingly, both the battery packs 54 of FIGS. 1D and 1E can physically and electrically couple to either of the power tools 10 of FIG. 1A or 1C.

Figure 2:
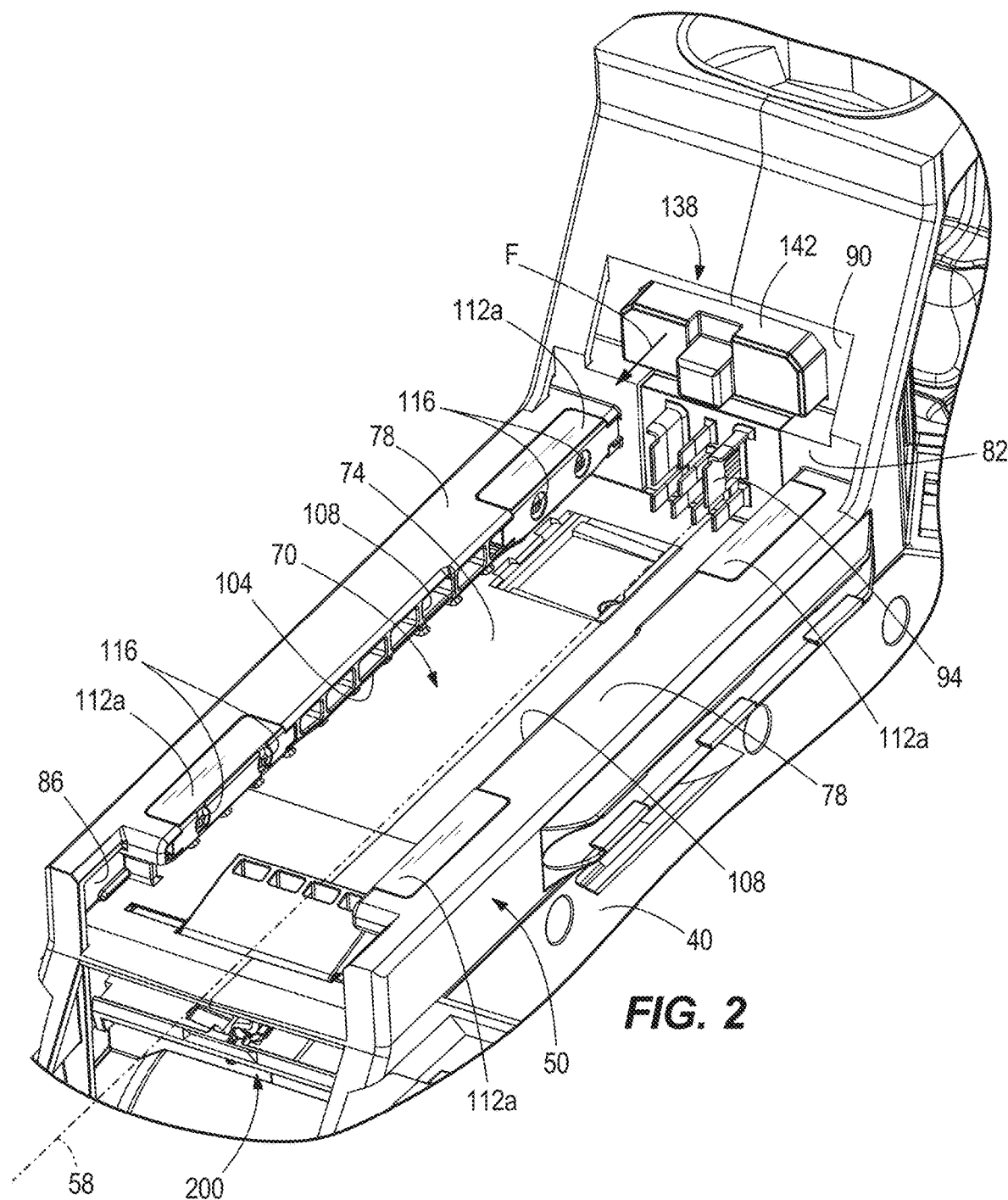
FIG. 2 is a perspective view of a portion of the housing of the electric device shown in FIGS. 1A and 1C, including reinforcement portions according to one embodiment.

With reference to FIG. 1A-2, the power tool 10 includes a housing 40 including a battery pack receiving portion 50 configured to receive the interface 55 of the battery pack 54. The battery pack receiving portion 50 has a longitudinal axis 58 (e.g., battery insertion axis) and a cavity 70 defined by a lower surface 74, a pair of sidewalls 78, and an end wall 82. An open end 86 is opposite the end wall 82. In addition, an upper end wall 90 extends above the end wall 82 proximate the cavity 70. Device contacts 94 extend from the housing and are supported on the end wall 82. The device contacts 94 are configured to mechanically and electrically engage with the battery pack 54 to transfer electrical power therebetween.

Further with respect to FIG. 2, the battery pack receiving portion 50 includes stepped grooves 104 extending between the open end 86 and the end wall 82 (e.g., as illustrated, from the open end 86 to the end wall 82). The stepped grooves 104 are defined by rails 108 disposed on the sidewalls 78. The rails 108 protrude from the sidewalls 78 to define an upper extent of the grooves 104 that face the lower surface 74.

Figure 3:
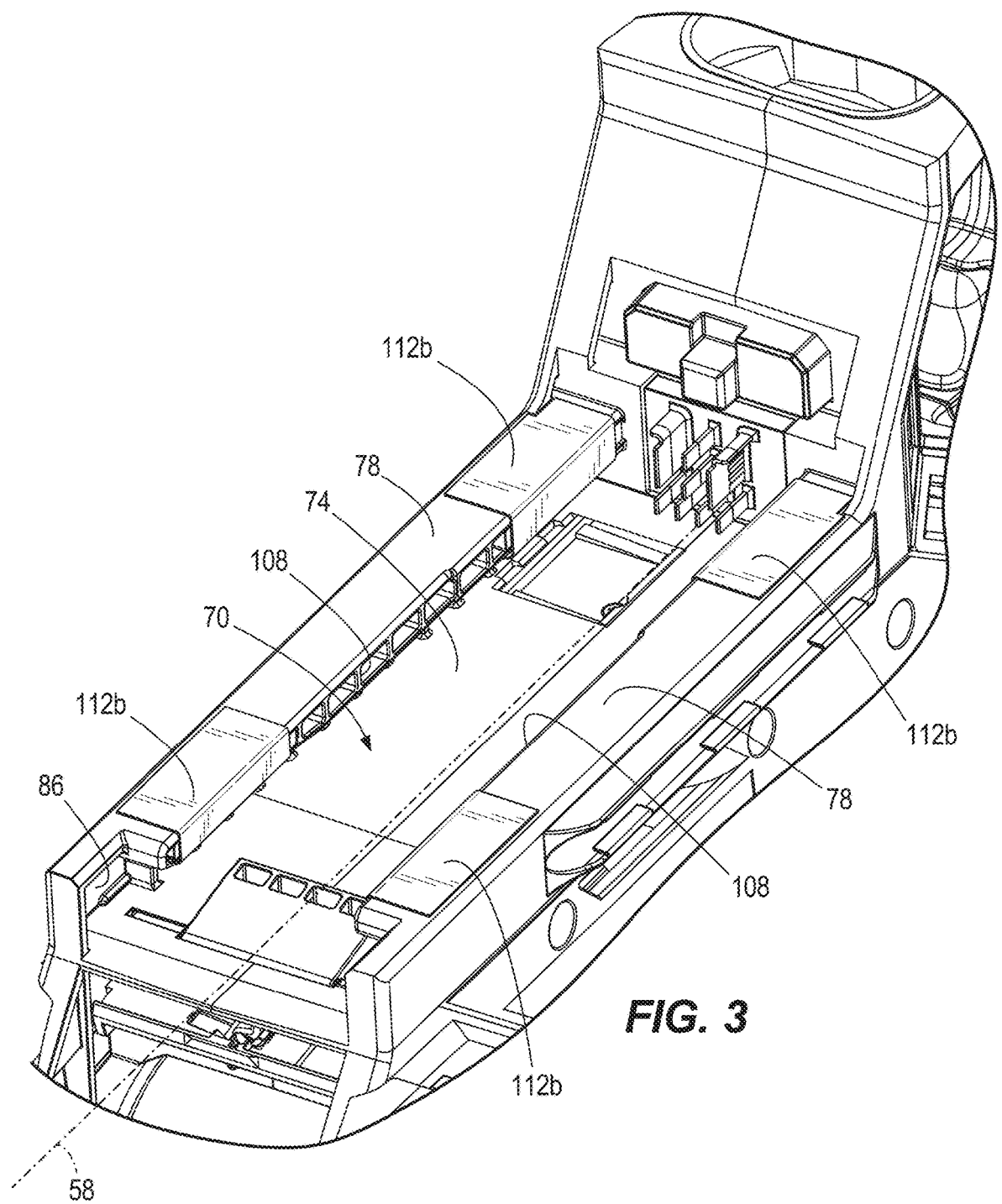
FIG. 3 is a perspective view of a portion of a battery pack receiving portion of the electric device of FIG. 2 including reinforcement portions according to another embodiment.

Moreover, each of the rails 108 include one or more reinforcement members 112. The reinforcement members may be formed from any suitable wear resistant material. A "wear resistant material" may be any material that resists wear or deformation more than the surrounding material (e.g., plastic) of the interface of the tool handle. Non-limiting examples of wear resistant materials are metal and glass-filled Nylon plastic. Moreover, the reinforcement members 112 can be achieved in several ways. In the embodiments illustrated in FIGS. 2-3, the reinforcement members 112a, 112b are formed from a metal material and are permanently coupled to the rails 108. In other embodiment, the reinforcement members 112a, 112b may be formed from glass-filled Nylon plastic. In the embodiment illustrated in FIG. 2, the reinforcement members 112a are metal inserts that are inserted into and coincident with the rails 108. Moreover, the metal inserts 112a are coupled to the rails 108 by fasteners 116. The fasteners 116 may be any type of suitable, permanent fasteners. For example, the fasteners 116 may be screws with sufficient adhesive (e.g., glue) to prevent removal, or tamper-proof (non-removable) screws without adhesive. In the embodiment illustrated in FIG. 3, the reinforcement members 112b are formed of a sheeting metal covering. Here, all or a portion of the rails 108 are wrapped in the sheet-metal covering 112b and permanently adhered (e.g., by adhesive or fasteners) to the rails 108. Additionally, while there are two reinforcement members 112a, 112b on either end of each rail 108 in FIGS. 2-3, there may be fewer or more reinforcement members 112a, 112b in other embodiments. In other words, each rail 108 may only have a single reinforcement member 112a, 112b on either end of the rail 108 or additional reinforcement members 112a, 112b may be positioned at other locations along the rails 108 (e.g., in the middle of the rail 108).

In further embodiments, the reinforcement member 112 may be a powdered metal or glass-filled Nylon plastic insert (not shown) that is incorporated into the housing 40 of the electric device 10. In particular, the powered metal insert may be positioned in a tool mold such that the plastic portions flow around it thereby encapsulating the powdered metal insert into the tool housing. Regardless of how the reinforcement members 112 are inserted into and permanently coupled to the rails 108, the contact surfaces of the rails 108 are at least partially made of metal to reduce wear. That is, the reinforcement metal members 112 are positioned relative to the rails 108 at locations where the battery pack 54 contacts the rails 108 to prevent the surfaces of the rails 108 at those locations from wearing down as a result of contact therebetween.

Figure 4:
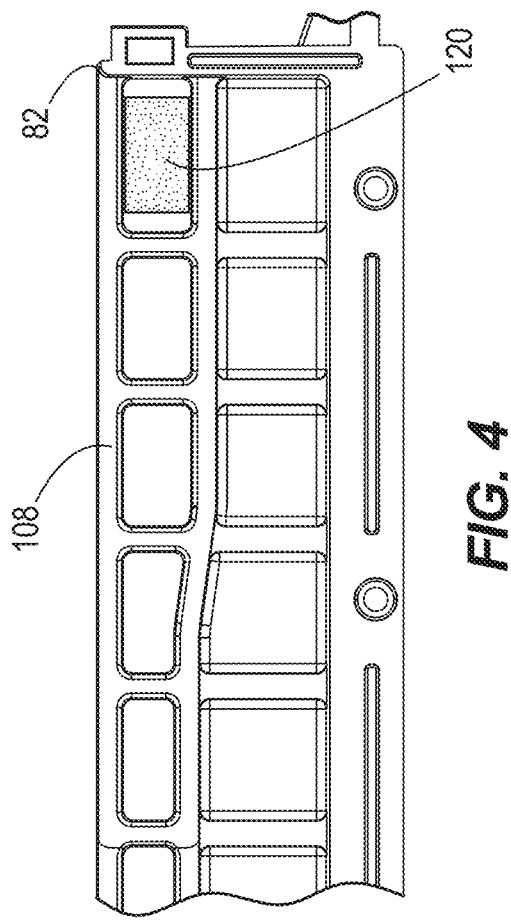
FIG. 4 is a detailed side view of a portion of the battery receiving portion of FIG. 3 including an elastomeric member.
Figure 5:
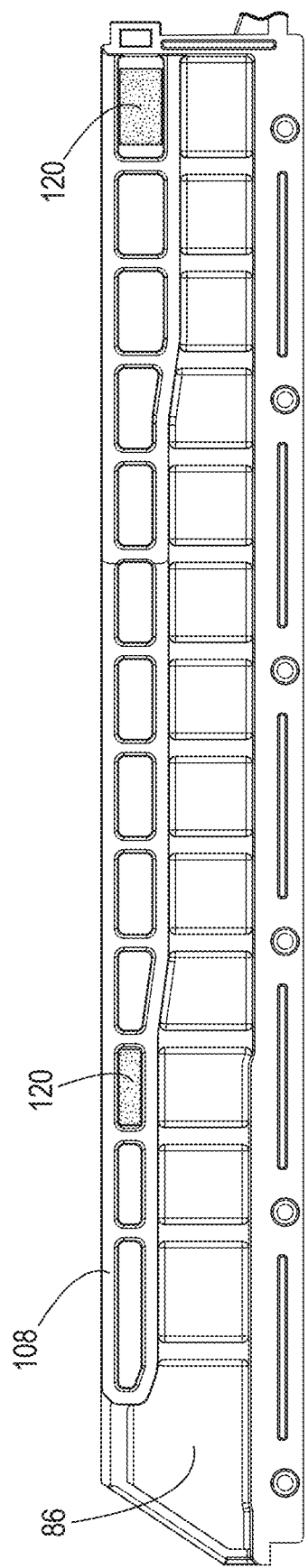
FIG. 5 is a detailed side view of a portion of the battery receiving portion of FIG. 3 including multiple elastomeric members.

Each of the rails 108 may also include elastomeric members 120 at one or more locations. As shown in FIG. 4, a single elastomeric member 120 is positioned at an end of the rail 108 adjacent the end wall 82. As shown in FIG. 5, two elastomeric members 120 are positioned in the rail 108 and spaced apart along a length of the rail 108. In particular, there is a first elastomeric member 120 that is positioned at an end of the rail 108 adjacent the end wall 82 and a second elastomeric member 120 that is positioned at another location along the rail 108 and spaced apart from the first elastomeric member 120 (e.g., adjacent the open end 86 of the cavity 70). The elastomeric members 120 act as biasing members or springs, and therefore impart a force in a perpendicular to the longitudinal axis 58 of the battery receiving portion 50. The elastomeric members 120 take up the clearance between the rail 108 and the battery pack 54 thereby allowing a higher compression force and spring rate.

With renewed reference to FIG. 2, an ejector 138 is supported on the end wall 90. The ejector 138 includes an ejection member 142 biased by a biasing member (e.g., one or more springs (not shown)) to protrude through the end wall 90. When the battery pack 54 is attached to the battery pack receiving portion 50, the ejection member 142 is pushed into the end wall 90 to compress the biasing member. From this position, the spring ejector 138 is configured to exert a force F on the battery pack 54 to push the battery pack 54 out of the battery pack receiving portion 50 (e.g., upon release of a latching mechanism 200, discussed in greater detail below).

One embodiment of the latching mechanism 200 is shown in greater detail in FIGS. 6-10B. The latching mechanism 200 is supported by the housing 40 and includes a pivotable actuator or handle 204 that operatively engages a pivotable latch member 208. The latching mechanism 200 includes a first or latched position and a second or released position, which will be discussed in greater detail below.

The actuator 204 is pivotably coupled to the housing 40. With respect to FIG. 9, the actuator 204 includes a first end 212 that is accessible by the user (e.g., accessible from an outside of the housing 40), a second end 216 with a finger 220 that extends into the housing 40 of the electric device 10, and projections 224 that extend from opposite sides thereof into openings (not shown) in the housing 40. The projections 224 define a first pivot axis 228, which is positioned between the first end and the second end and oriented perpendicular to the longitudinal axis 58.

Figure 6:
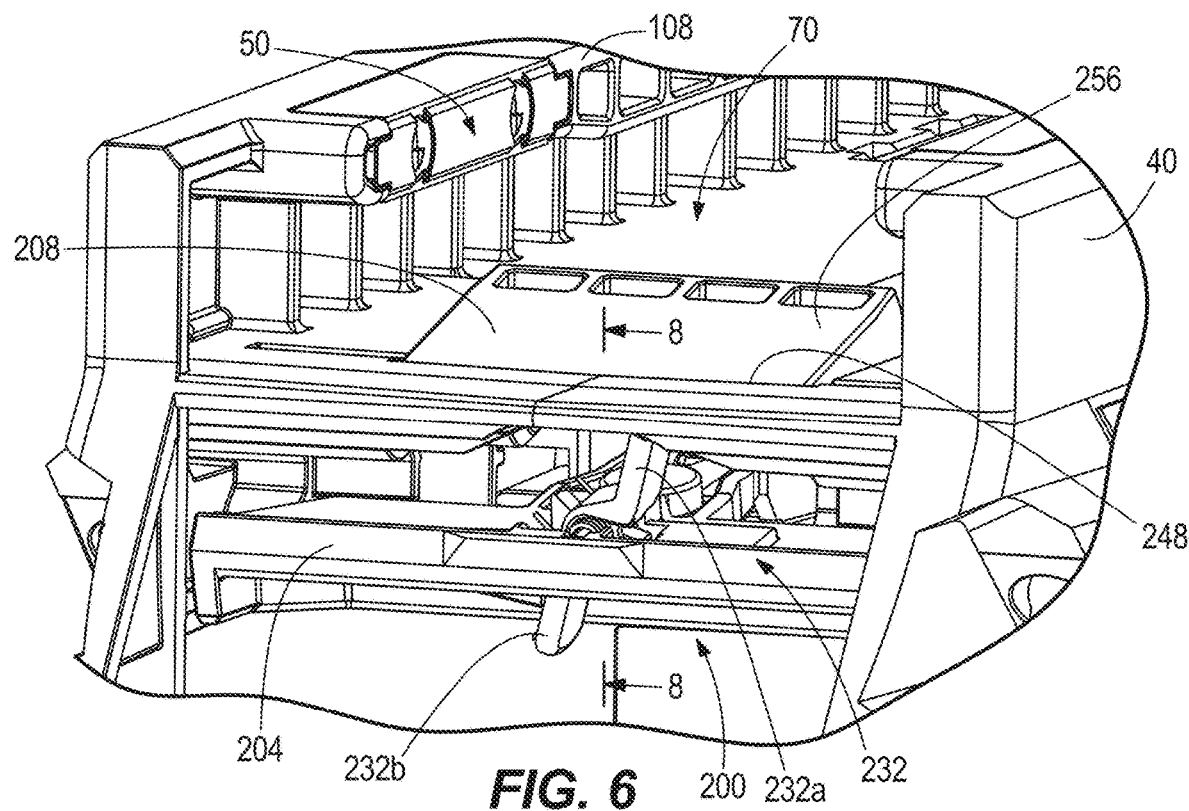
FIG. 6 is a perspective view of the battery receiving portion of FIG. 2 including a latching mechanism according to one embodiment.
Figure 7:
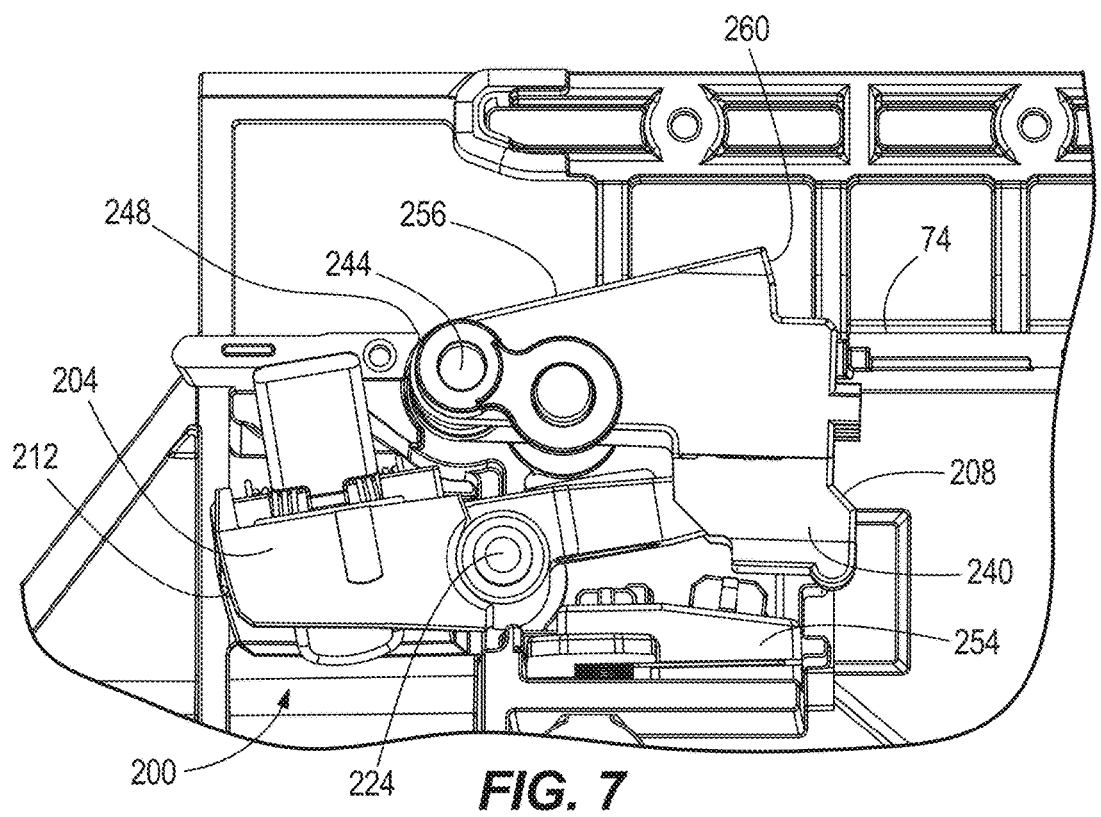
FIG. 7 is a side view of the latching mechanism of FIG. 6 with a side of the battery receiving portion removed.
Figure 8:
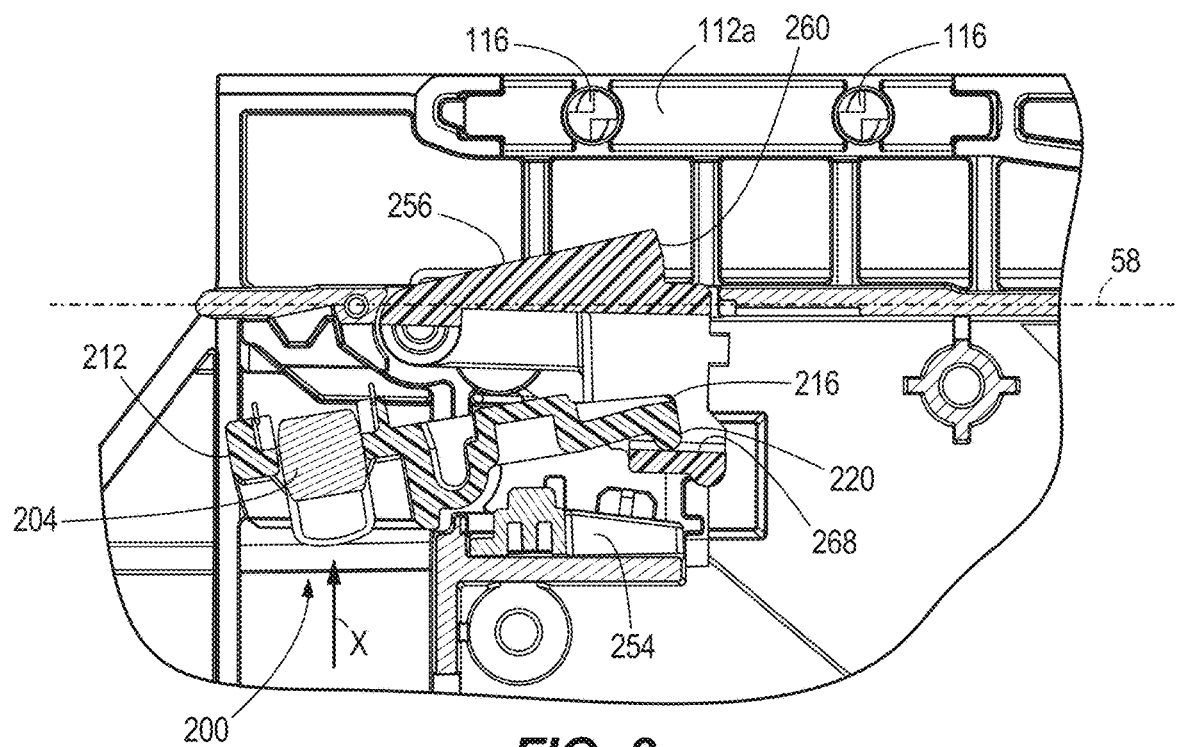
FIG. 8 is a cross-section view of the latching mechanism along a longitudinal axis of the battery receiving portion of FIG. 6.
Figure 9:
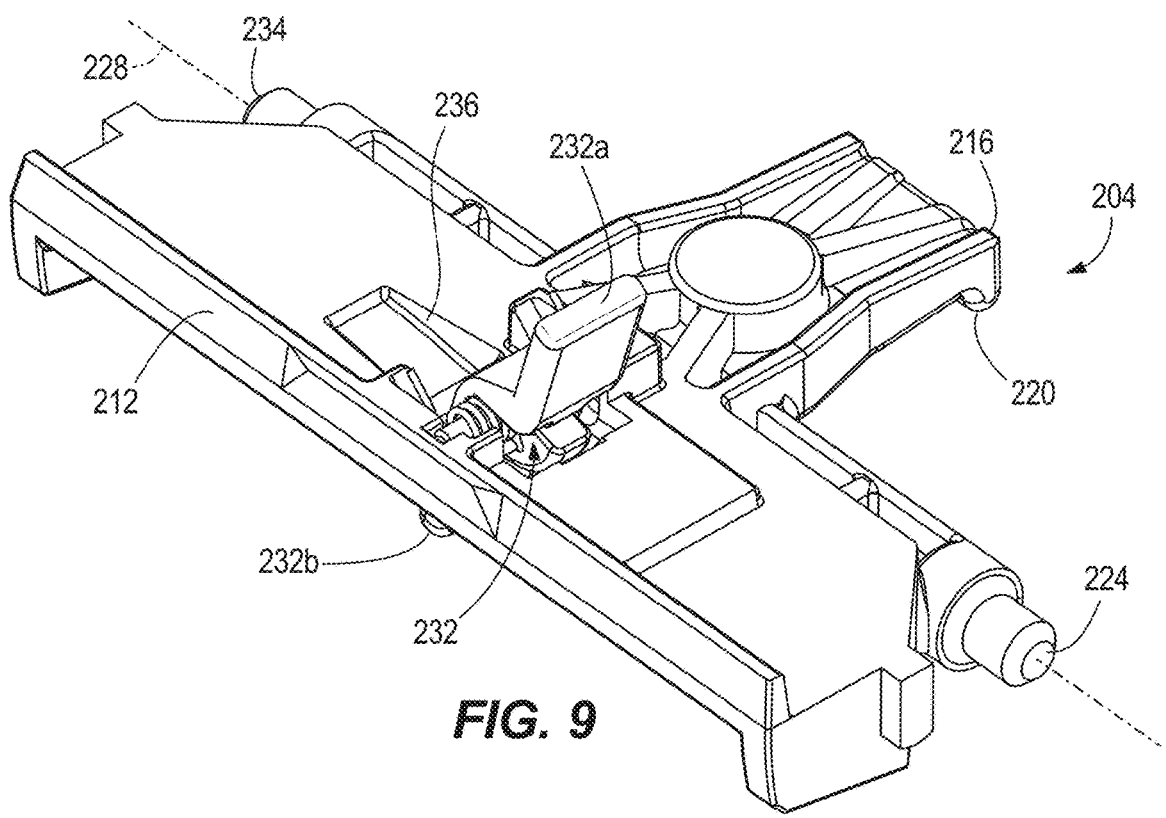
FIG. 9 is perspective view of an actuator of the latching mechanism of FIG. 6.
Figure 10A:
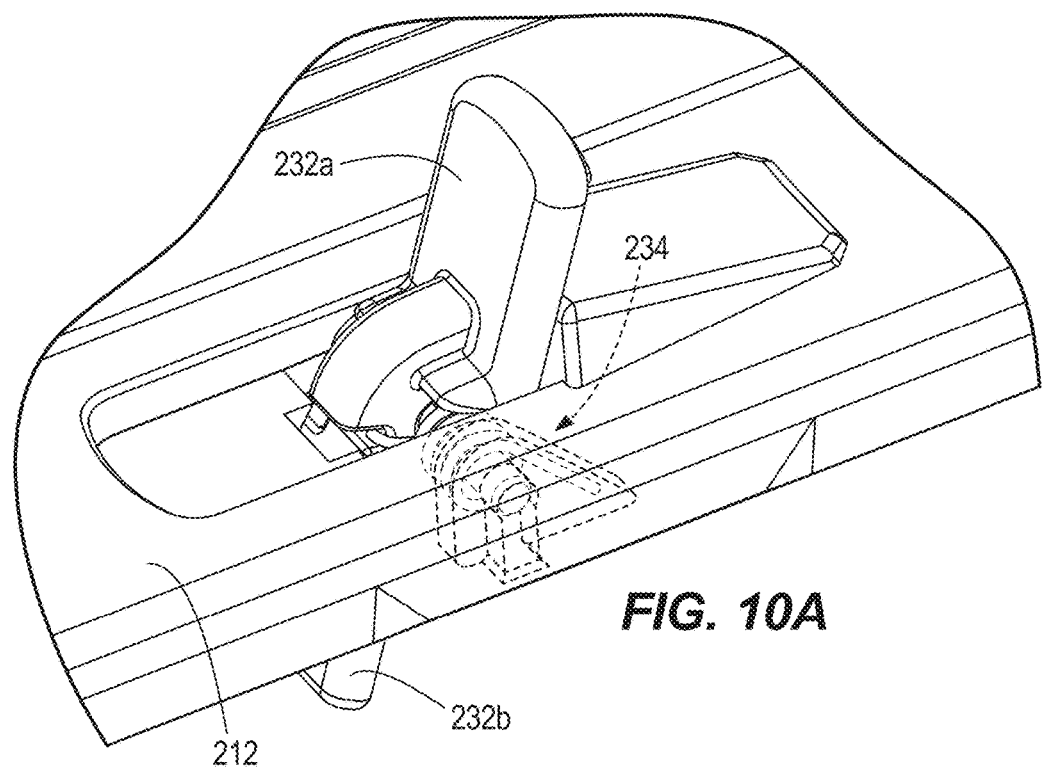
FIG. 10A is a detailed view of a portion of the actuator of the latching mechanism of FIG. 6.
Figure 10B:
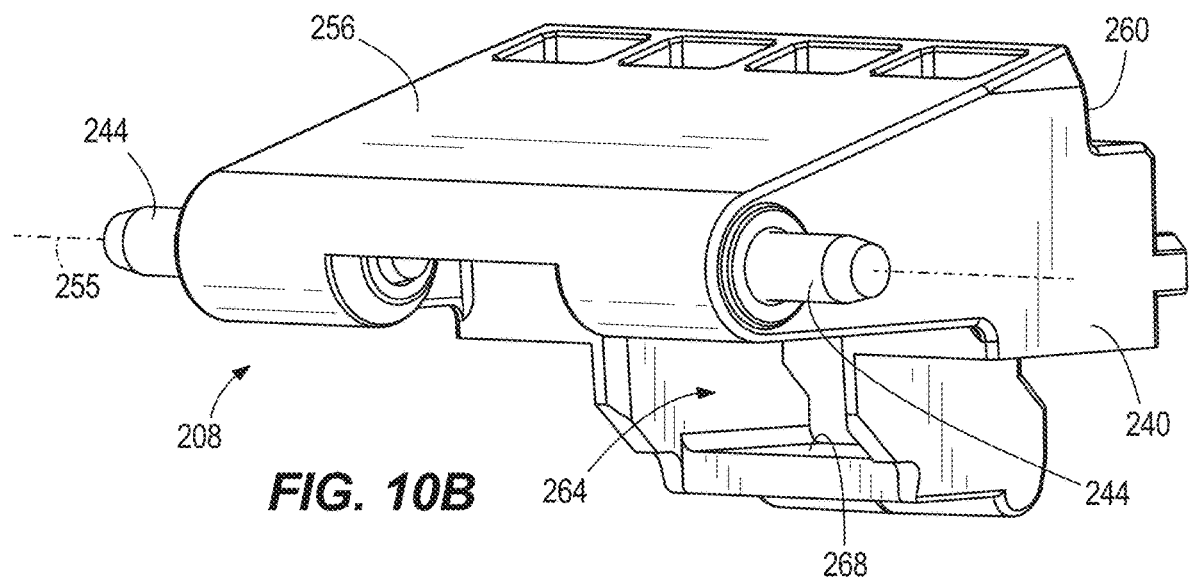
FIG. 10B is a perspective view of a latching member of the latching mechanism of FIG. 6.

A lock 232 is movably (e.g., pivotably) coupled to the actuator 204. In particular, the first end 212 of the actuator includes the lock 232, which is movable (e.g., pivotable) relative to the actuator 204. The lock 232 has first and second ends 232a, 232b (FIG. 9). The lock 232 is positionable in a locked position in which in which the actuator 204 (and therefore the latching mechanism 200) is prevented from moving from the latched position to the released position. That is, in the locked position, the first and second ends 232a, 232b extend from opposite surfaces of the first end 212 of the actuator 204 such that an accidental force on the first end 212 forces the lock 232 to abut the housing 40 (FIGS. 6-7). Accordingly, the lock 232 prevents the user from accidentally moving the actuator 204 to move the latch member 208, discussed below. The lock 232 is maintained in the lock position by a biasing mechanism 234 (e.g., spring) in the illustrated embodiment, but could be maintained in the locked position by other suitable means in other or additional embodiments. The lock 232 is also movable (e.g., pivotable or rotatable) to an unlocked position in which the actuator 204 (and therefore the latching mechanism 200) is permitted to move from the latched to the released position. As shown in FIG. 9, the lock 232 is pivotable about an axis 233 that is perpendicular to the first pivot axis 228. That is, in the unlocked position, the first and second ends 232a, 232b are positioned within grooves 236 in opposite surfaces (only one of which is shown) of the first end 212 of the actuator 204. In particular, the user exerts a force on one of the locking ends 232a, 232b to overcome the bias of the spring 234 and move the first and second ends 232a, 232b into the respective grooves 236. The actuator 204 is movable when the lock 232 is in the unlocked position, as discussed in greater detail below. When the user releases the force on the lock 232, lock 232 returns to the locked position by the bias of the spring 234.

With respect to FIGS. 6-8 and 10, the latch member 208 is movably or pivotably coupled to the housing 40 of the electric device 10 and configured to selectively engage the interface 55 of the battery pack 54. In particular, the latch member 208 includes a body 240 and pins 244 that extend outwardly from the body 240. The pins 244 are pivotably coupled to the housing 40 adjacent a bore 248 defined in the lower surface 74 of the cavity 70. More specifically, the pins 244 are received by openings (not shown) in the housing 40. The pins 244 define a second pivot axis 254. The second pivot axis 254 is perpendicular to the longitudinal axis 58 and parallel to the first pivot axis 228. The latch member 208 is pivotably disposed in the bore 248 and is biased by one or more biasing members 254 (e.g., a spring such as a coil spring, a torsion spring, etc.) to protrude through the bore 248 and into the cavity 70. The body 240 of the latch member 208 has an inclined surface 256 (e.g., angled about 30 degrees to about 60 degrees relative to the lower surface 74) facing toward the open end 86 and a generally vertically-extending surface 260 (e.g., about 0 degrees to about 10 degrees relative to a vertical axis) facing toward the end wall 82. The body 240 of the latch member 208 also defines an opening 264 that has a ledge 268. The opening 264 receives the second end 216 of the actuator 204 and the finger 220 is configured to exert a force on the ledge 268.

As discussed above, the second end 216 of the actuator 204 selectively engages with the latch member 208 via the opening 264 with the ledge 268 thereof. The biasing member 254 biases the latch member 208 into the first position. That is, in the first position (FIGS. 6 and 7), the biasing member 254 biases the latch member 208 such that it extends through the bore 248 in the housing 14 and projects from housing 40 (e.g., projects from the lower surface 74 of the cavity 70). In the first position, the second end 216 of the actuator 204 is positioned within the opening 264 and adjacent the ledge 268, and the lock 232 is in the locked position. In other words, no force is exerted on the latch member 208 in the first position. In the second position, the latch member 208 is positioned substantially within the housing 14. In other words, the latch member 208 is either entirely positioned within the housing 40 or most (e.g., at least 80% to 90%) of the latch member is positioned within the housing 40. In the second position (not shown), the second end 216 of the actuator 204 is positioned within the opening 264 and the finger 220 exerts a force on the ledge 268, the spring 254 is compressed, and the lock 232 is in the unlocked position.

To move the latch member 208 from the first position to the second position, the lock 232 is moved (e.g., pivoted or rotated) to the unlocked position. Then, a force is exerted on the first end 212 of the actuator 204 in the direction of arrow X (FIG. 8), which pivots the actuator 204 about the first pivot axis 224. Accordingly, the second end 216 of the actuator 204 moves (e.g., pivots or rotates) in the direction opposite of arrow X such that the finger 220 engages the ledge 268 to depress the latch member 208 (e.g., pull the latch member 208 out of the cavity 70). As force is exerted on the ledge 268, the latch member 208 moves (e.g., pivots or rotates) about the second pivot axis 252 such that the latch member 208 moves in the opposite direction of arrow X against the bias of the spring 254 and into the housing 40 of the electric device 10. When the first end 212 of the actuator 204 is released, the spring 254 automatically moves the latch member from the second position to the first position when force on the actuator 204 is removed. In particular, the spring 254 exerts a biasing force on the latch member 208 in the direction of arrow X, thereby moving (e.g., pivoting or rotating) the latch member 208 back to the first position. Also, the lock 232 then moves (e.g., pivots or rotates) back to the locked position by the bias of the spring 234, as discussed above.

The battery pack 54 is coupled to the battery pack receiving portion 50 by aligning the rails 56 of the battery pack 54 with the grooves 104 of the battery pack receiving portion 50, and subsequently sliding the battery pack 54 along a longitudinal axis 58. Sliding the battery pack 54 along the longitudinal axis 58 forces the latch member 208 against the bias of the spring 254 and into the second position until a rails 56 in the battery pack 54 overlays the latch member 208. When the recess is positioned adjacent the latch member 208, the latch member 208 is returned back into the first position by the bias of the biasing member 254 such that the latch member 208 is received by the recess in the battery pack 54. When secured to the battery pack 54 and electric device 10 are secured to one another, the device contacts 94 engage the battery contacts (not shown).

FIGS. 11-26 illustrate other latching mechanisms for use with the electric device 10.

Figure 11:
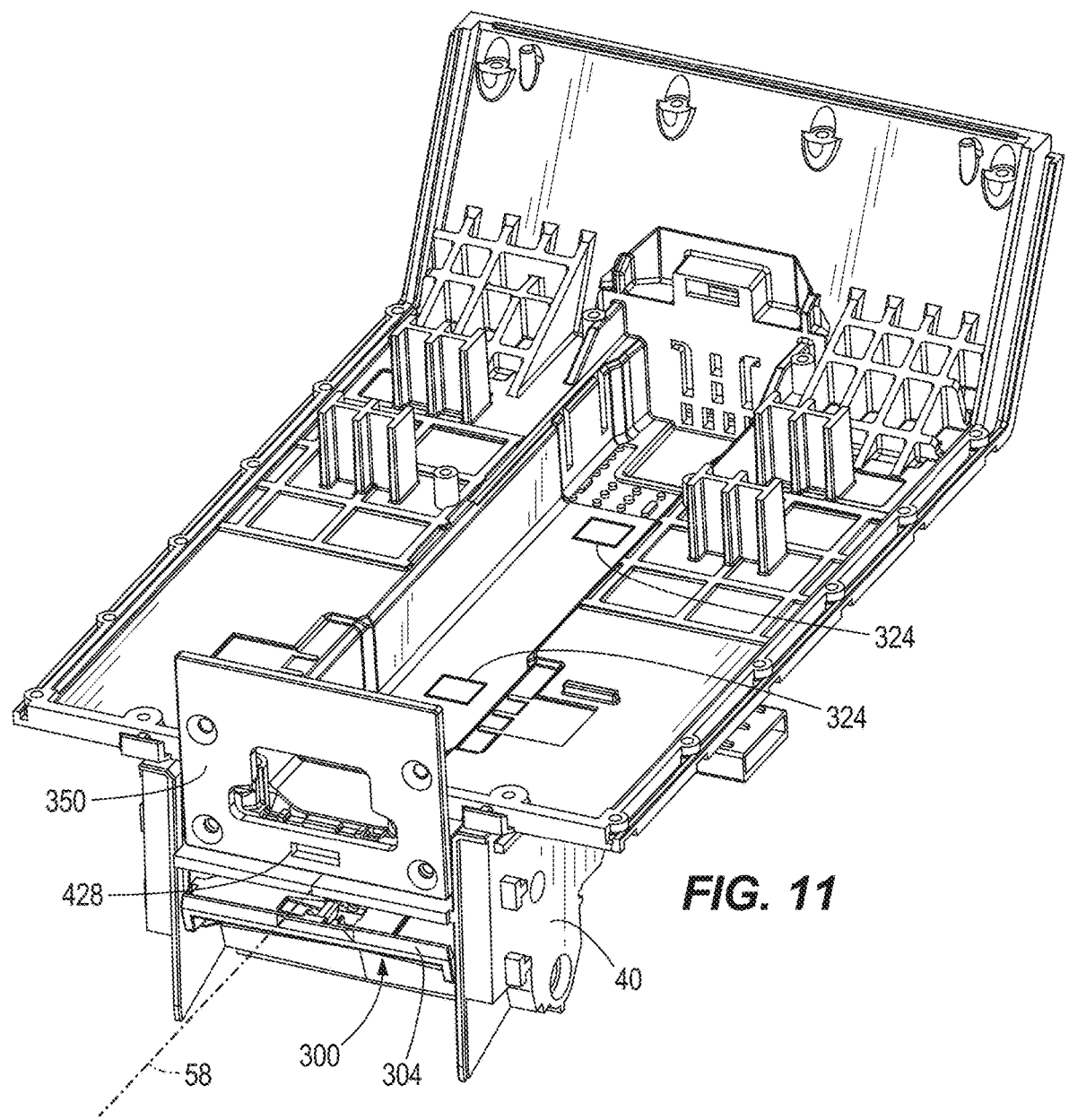
FIG. 11 is a perspective view of a portion of the housing of the electric device and a portion of a housing of the battery pack shown in FIGS. 1A and 1C, the electric device including a latching mechanism according to another embodiment.
Figure 12:
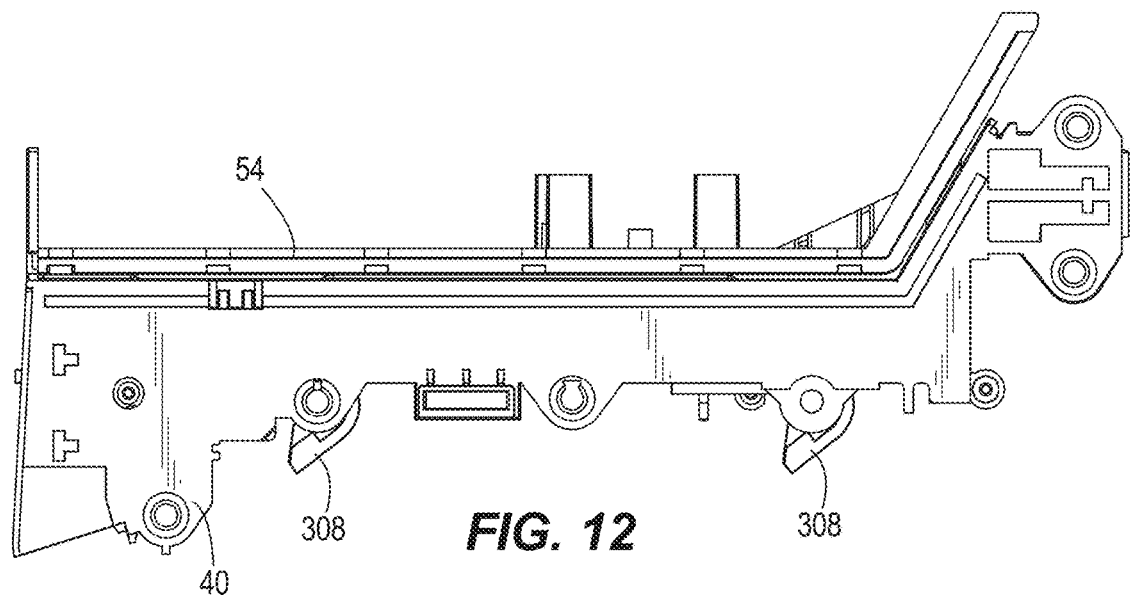
FIG. 12 is a side view of the portion of the housing of the electric device, the portion of the housing of the battery pack, and the latching mechanism of FIG. 11.
Figure 13:
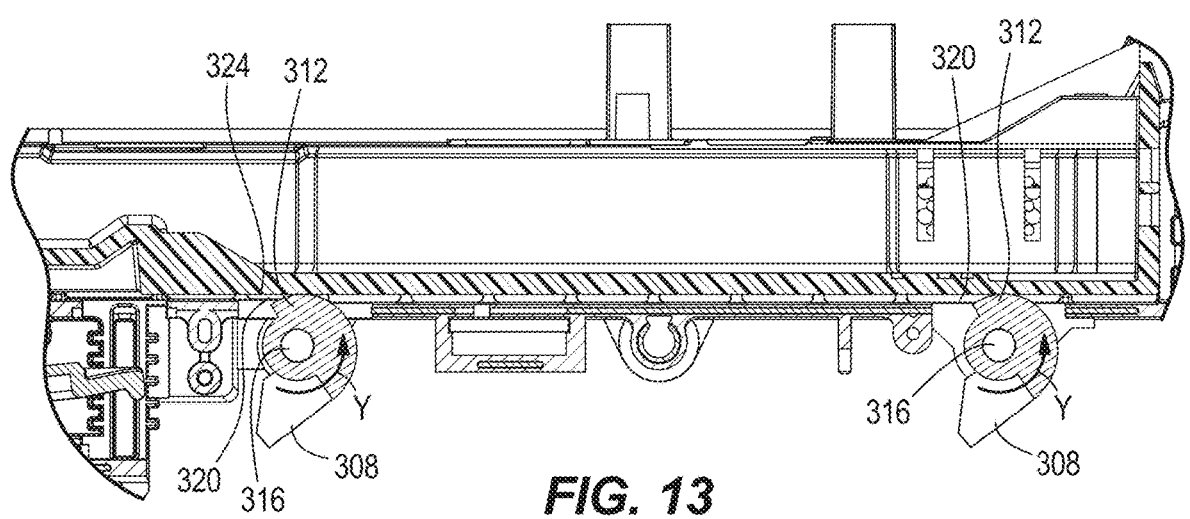
FIG. 13 is a side view of the portion of the housing of the electric device, the portion of the housing of the battery pack, and the latching mechanism of FIG. 11 with a side of the housing of the electric device removed.

FIGS. 11-13 illustrate a latching mechanism 300 according to another embodiment and including an actuator or handle 304 that operatively engages one or more cam members 308 that are positioned within the housing 40. In the illustrated embodiment, two cam members 308 are rotatably coupled to the housing 40; however, in further embodiments there may be a single cam member 308 or more than two cam members 308. The cam members 308 are movably or rotatably coupled to the electric device 10. In particular, the cam member 308 includes an eccentric body forming a cam surface 312. Each of the cam members 308 is biased by a biasing members 316 (e.g., a spring or the like) in a first direction in the direction of arrow Y and into a first position (FIG. 13) in which the cam surfaces 312 project through respective bores 320 in the lower surface 74 of the cavity 70. In the second position, the bias of the spring 316 is overcome and the cam surfaces 312 are positioned within the housing 40. To move the latching mechanism 300 from the first position to the second position, the actuator 304 is moved or pivoted to overcome the bias of the springs 316 and move the cam members 308 from the first position to the second position in an opposite direction than Y.

When the battery pack 54 is inserted along the longitudinal axis 58 the weight of the battery pack 54 overcomes the bias of the springs 316 to move the cam members 308 from the first position to the second position. When the battery pack is inserted such that complementary bores 324 in the battery pack overlay the cam members 308 and the springs 316 move the cam members 308 automatically from the second positon into the first position such that the cam surfaces 312 of the cam members 308 extend through the bores 320 in the cavity 70 and are seated in bores 324 of the battery pack 54.

FIGS. 14-21 illustrate latching mechanisms that have components that attached to a retaining plate or face plate 350 of the battery pack 54 rather than through bores in the housings of the electric device 10 and battery pack 54.

Figure 14:
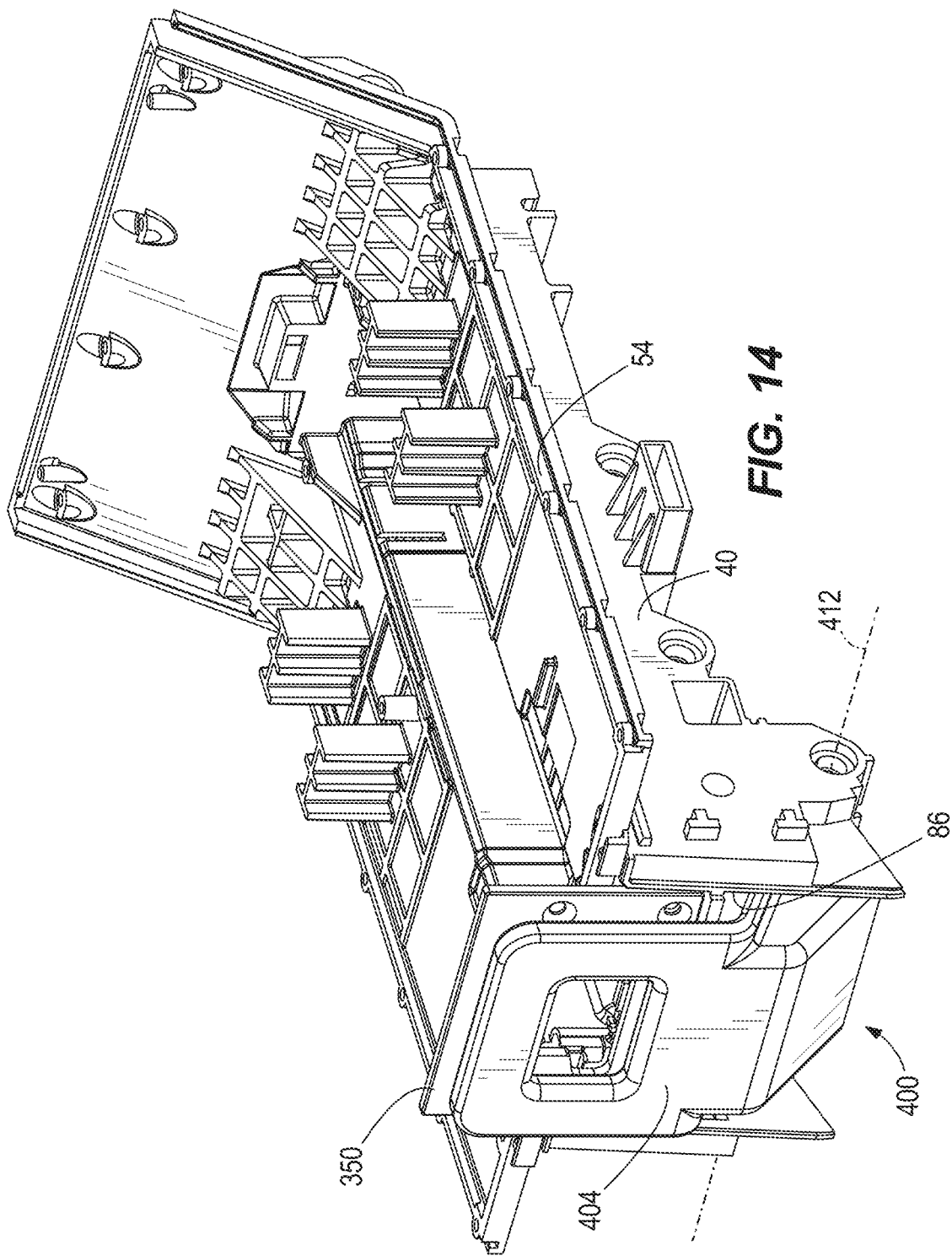
FIG. 14 is a perspective view of a portion of the housing of the electric device and a portion of a housing of the battery pack shown in FIGS. 1A and 1C, the electric device including a latching mechanism according to another embodiment.
Figure 15A:
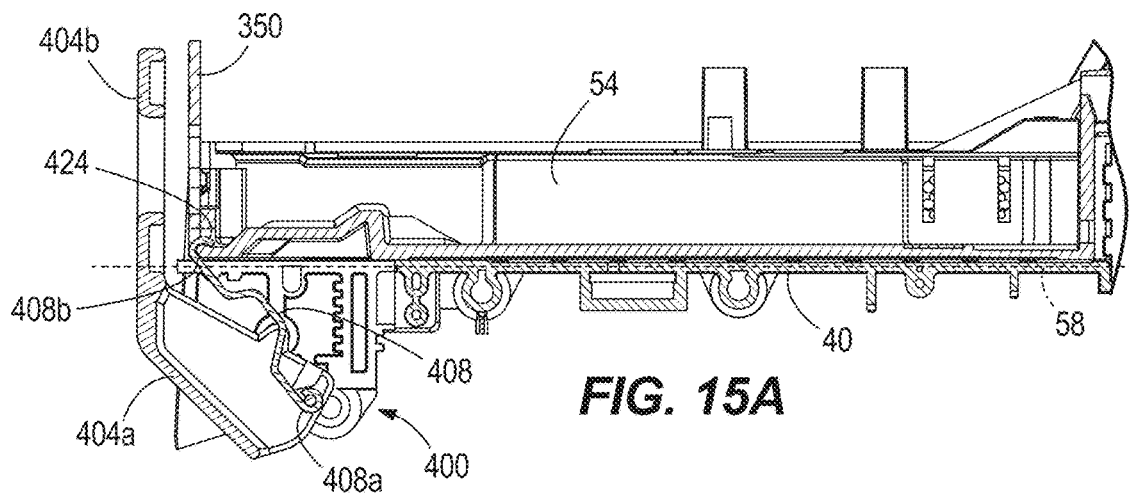
FIG. 15A a cross-sectional view of the latching mechanism of FIG. 14 along a longitudinal axis of the battery receiving portion of FIG. 14, the latching mechanism being in a first position.
Figure 15B:
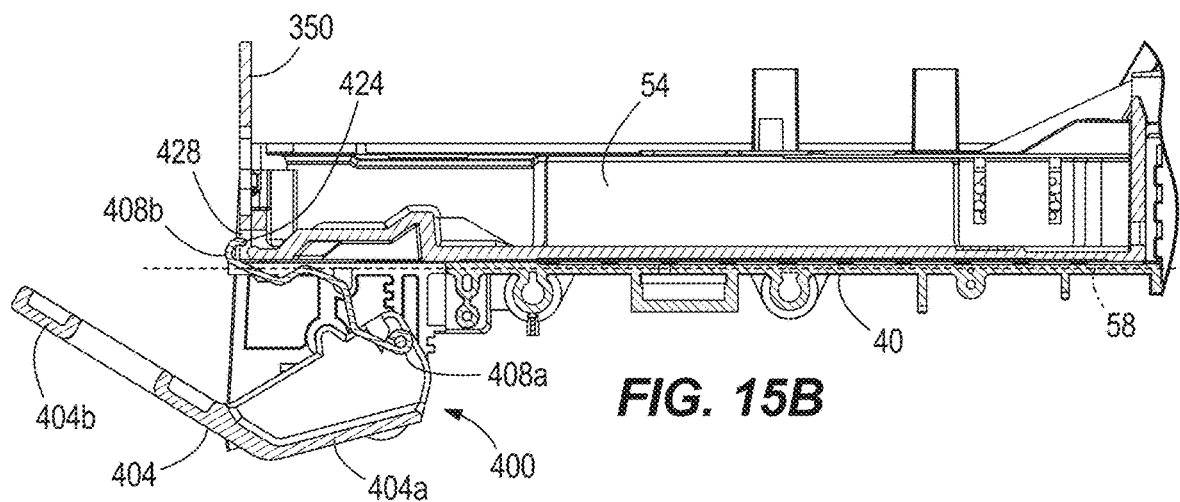
FIG. 15B a cross-sectional view of the latching mechanism of FIG. 14 along a longitudinal axis of the battery receiving portion of FIG. 14, the latching mechanism being in between the first position and a second position.
Figure 15C:
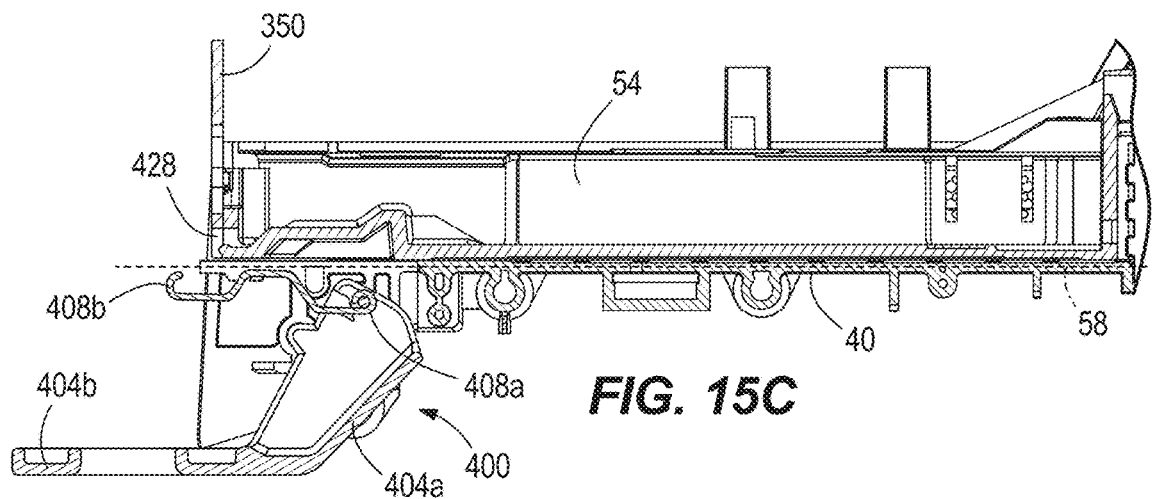
FIG. 15C a cross-sectional view of the latching mechanism of FIG. 14 along a longitudinal axis of the battery receiving portion of FIG. 14, the latching mechanism being in the second position.
Figure 16:
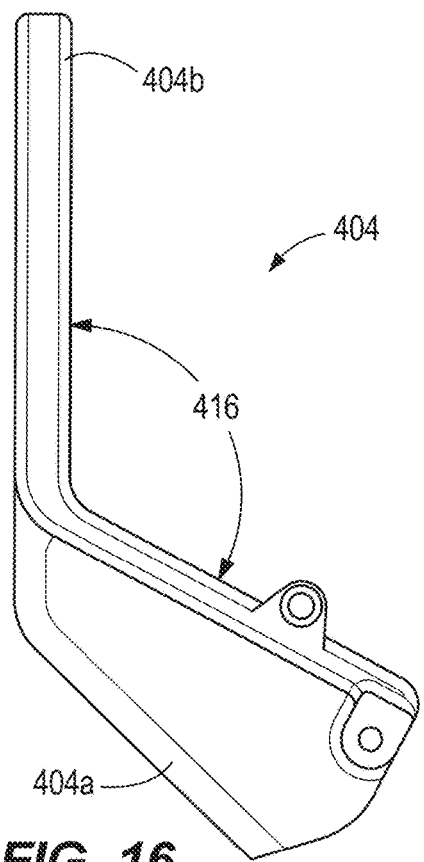
FIG. 16 is a side view of an actuator of the latching mechanism of FIG. 14.
Figure 17:
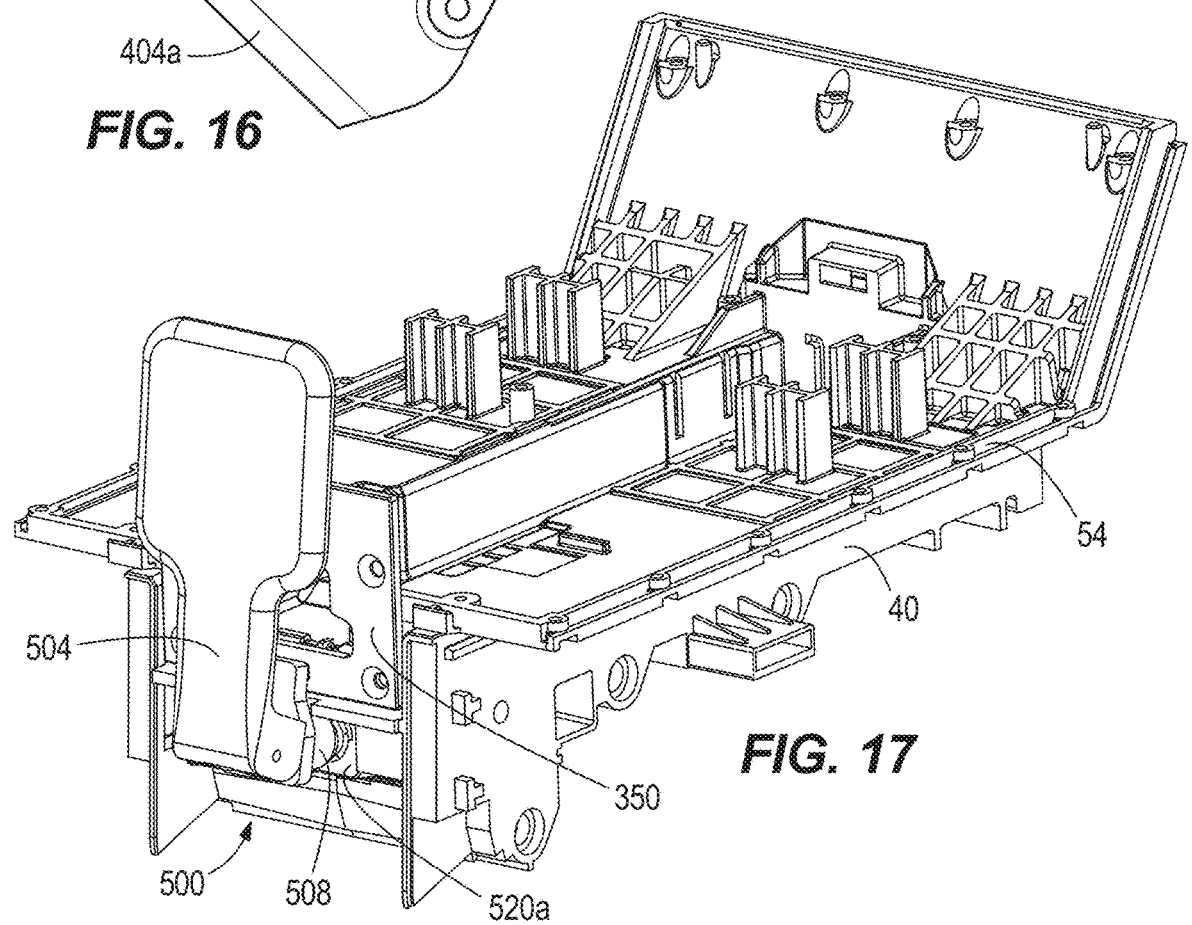
FIG. 17 is a perspective view of a portion of the housing of the electric device and a portion of a housing of the battery pack shown in FIGS. 1A and 1C, the electric device including a latching mechanism according to another embodiment.
Figure 18:
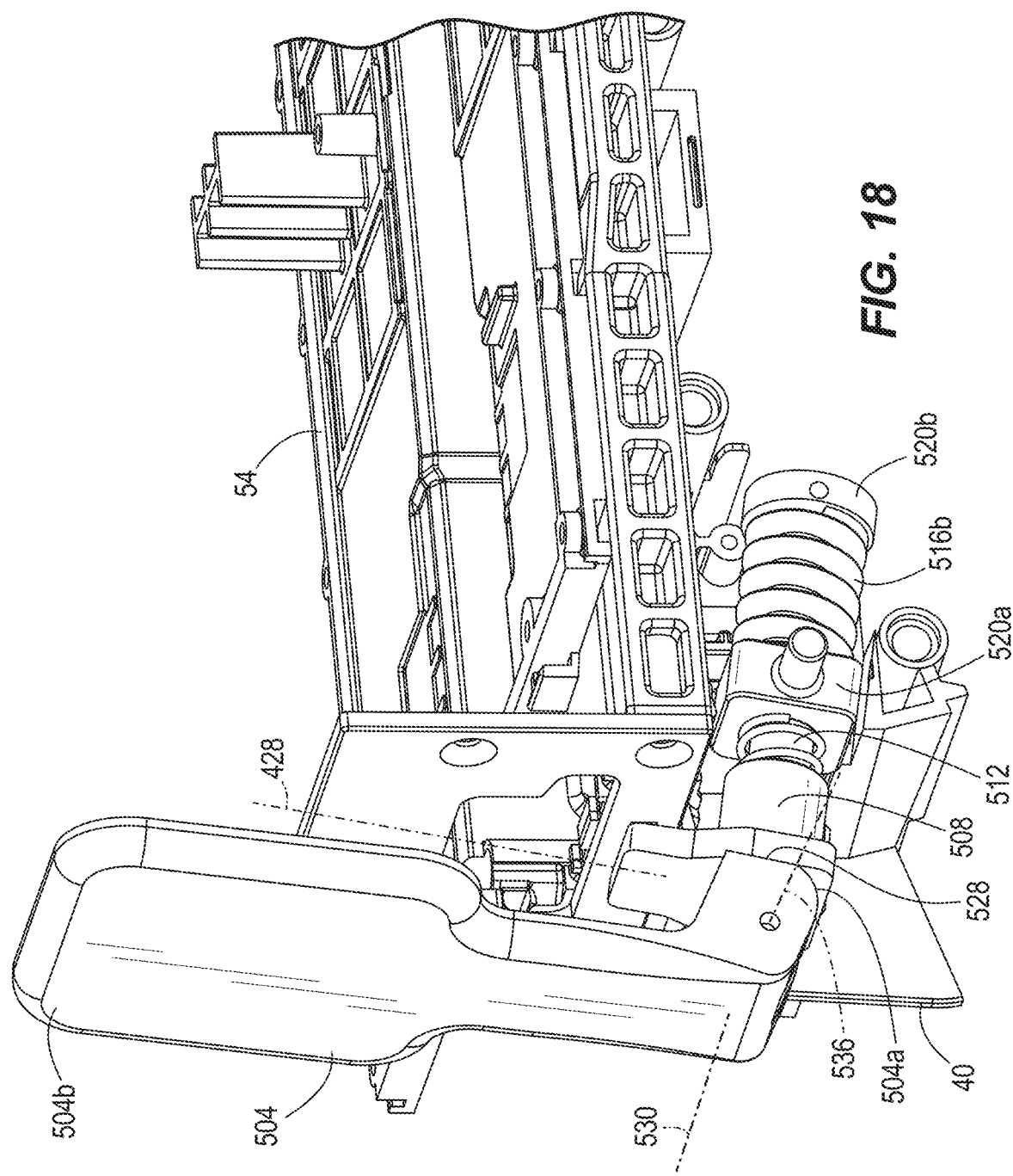
FIG. 18 is a perspective view of the portion of the housing of the electric device, the portion of the housing of the battery pack, and the latching mechanism of FIG. 17 with a side of the housing of the electric device removed.
Figure 19:
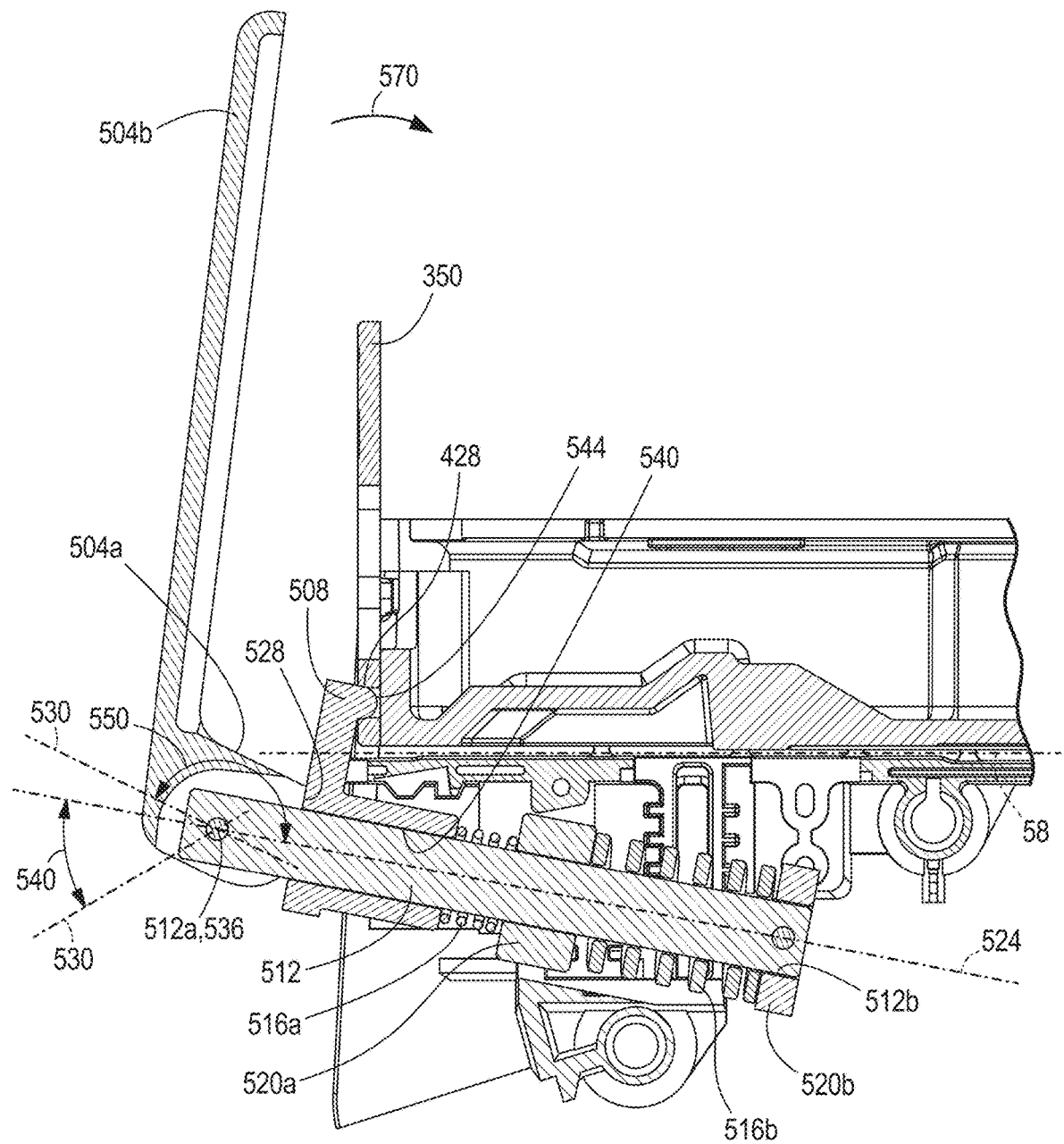
FIG. 19 is a cross-sectional view of the latching mechanism of FIG. 17 along a longitudinal axis of the battery receiving portion of FIG. 17.
Figure 20:
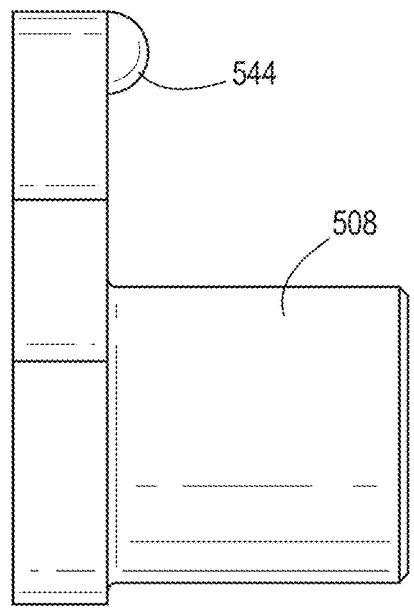
FIG. 20 is a side view of a latching member of the latching mechanism of FIG. 17.

FIGS. 14-16 shows a latching mechanism 400 on the electric device 10 according to another embodiment. The latching mechanism 400 includes a handle or actuator 404 and a linkage or biasing member 408 (e.g., spring) coupled to the actuator 404. The actuator 404 has a first portion 404*a* that extends into the housing 40 of the electric device 10 and a second portion 404*b* that is coupled to the first portion 404*a*. The first portion 404*a* is movably or pivotably coupled to the housing 40 and defines a pivot axis 412. The second portion 404*b* is positioned at an angle 416 relative to the first portion 404*a* that ranges between 45 degrees and 135 degrees. In the illustrated embodiment, the angle 416 between the first portion 404*a* and the second portion 404*b* is approximately 100 degrees. Approximately as used herein may be plus or minus five degrees. The second portion 404*b* is movable relative to the open end 86 of the cavity 70. Moreover, the spring 408 has a first end 408*a* that is coupled to the first part 404*a* of the actuator 404 and a second end 408*b* that extends from the first end 408*a*. The second end 408*b* includes a finger or lip 424 (FIG. 15) that is configured to be received by an opening or pocket 428 (FIG. 13) in the face plate 350 of the battery pack 54.

The latching mechanism 400 is in a first position when the battery pack 54 and electric device 10 are coupled to one another (FIGS. 14 and 15A). In the first position, the second end 408*b* of the spring 408 is positioned in the pocket 428 of the face plate 350. Also, in the first position, a distal end of the first part of the actuator is spaced apart from housing 40, and the second part 404*b* of the actuator 404 is substantially parallel to the face plate 350 of the battery pack 54 and the open end 86 of the cavity 70. Moreover, in the first position, the spring 408 is positioned at an angle relative to the longitudinal axis 58 the housing 40. That is, the actuator 404 of the latching mechanism 400 is at a substantially a zero degree angle 432 relative to the face plate 350 of the battery pack 54 in the latched position, and the spring 408 is in tension. The latching mechanism 400 is in a second position (FIG. 15C) when the battery pack 54 and electric device 10 are to be coupled to or decoupled from one another. That is, in the second position, the first part 404a of the actuator 404 is adjacent the housing 40 and the second part 404b of the actuator 404 of the latching mechanism 400 is oriented at a non-zero angle 432 relative to the open end 86 of the cavity 70 of the electric device 10. Also, in the second position, the spring 408 is positioned adjacent and substantially parallel to the longitudinal axis 58 of the housing 40.

Prior to coupling the battery pack 54, the actuator 404 of the latching mechanism 400 is in the second position (FIG. 15C). The user then aligns the rails 56 of the battery pack 54 with the grooves 104 of the battery pack receiving portion 50, and slides the battery pack 54 along the longitudinal axis 58. To move the latching mechanism 400 from the second position to the first position, the user moves (e.g., pivots or rotates) the actuator 404 toward the face plate 350 and the open end 86 of the cavity 70 to move the finger 424 of second end 408b of the spring 408 into the pocket 428 (FIG. 15B). Continued movement of the actuator toward the battery pack 54 moves the latch mechanism to the first position (FIG. 15A), which clamps the battery pack 54 to the electric device 10. To move the latching mechanism 400 from the first position to the second position, the user moves (e.g., pivots) the second part 404b of the actuator 404 away from the face plate 350 and the open end 86 of the cavity 70 to the non-zero angle 432, which removes the second end 408b of the spring 408 from the pocket 428 and releases the tension on the spring 408. Accordingly, the user can slide the battery pack 54 along the longitudinal axis 58 out of from the cavity 70 of the electric device 10.

FIGS. 17-20 illustrate a latching mechanism 500 on the electric device 10 according to another embodiment and including a handle or actuator 504, a latch member 508, a linkage 512, biasing members (e.g., springs) 516, and coupling members 520. The linkage 512 includes a first end 512a, a second end 512b, and a longitudinal axis 524. The actuator 504 has a first portion 504a defining a cam surface 528 and an actuator axis 530 and a second portion 504b that is coupled to the first portion 504a. The second portion 504b is positioned at an angle relative to the first portion 504a that ranges between 45 degrees and 135 degrees. In the illustrated embodiment, the angle between the first portion 504a and the second portion 504b is approximately 100 degrees.

The first portion 504a of the actuator 504 receives the first end 512a of the linkage and is movably (e.g., pivotably) coupled to the linkage 512. A pin 532 pivotably couples the linkage 512 to the actuator 504 and defines a pivot axis 536. The cam surface 528 is moveable or pivotable relative to the latch member 508. The second portion 504b is movable relative to the open end 86 of the cavity 70.

The linkage 512 passes through an aperture 540 (FIG. 19) in the latch member 508. The latch member 508 also has a projection that has a finger or lip 544 configured to be received by the pocket 428 in the face plate 350 of the battery pack 54. One of the springs 516 (e.g., the first spring 516a) is positioned between the latch member 508 and one of the coupling members 520 (e.g., the first coupling member 520a), and another spring 516 (e.g., the second spring 516b) is coupled between the first coupling member 520a and another coupling member 520 (e.g., the second coupling member 520b). The linkage 512 extends through the first coupling member 520a and the second end 512b of the linkage is coupled to or received by the second coupling member 520b. Accordingly, the linkage 512 extends from the actuator 504 to the second coupling member 520b. The first and second coupling members 520a, 520b are positioned within the housing 40 of the electric device 10. The springs 516a, 516b extend along the linkage 512.

The latching mechanism 500 is in a first position when the battery pack 54 and electric device 10 are coupled to one another (FIGS. 17-19), and in a second position when the battery pack 54 and electric device 10 are to be coupled to or decoupled from one another. The latching mechanism 500 also includes an intermediate position between the first and second positions. In the first position, the finger 544 of the latch member 508 is positioned in the pocket 428 of the face plate 350. Also, in the first position, the actuator axis 530 of the first portion 504a is at a first angle 550 relative to the longitudinal axis 524 of the linkage 512. Further with respect to FIG. 15A, the cam surface 528 engages the latch member 508, which overcomes the bias of the springs 516a, 516b. In the intermediate position, the actuator 404 is positioned such that the actuator axis 530 is substantially aligned with the longitudinal axis 524 of the linkage 512 and the finger 544 of the latch member 508 is removed from the pocket 428 in the face plate 350. In the second position, the finger 544 of the latch member 508 is spaced apart from (e.g., below) the pocket 428 of the face plate 350, and the second portion 504b of the actuator 504 is positioned below the cavity 70. Additionally, in the second position, the actuator axis 530 is positioned at a second angle 554 relative to the longitudinal axis 524 of the linkage 512. Moreover, in the second position, the cam surface 528 is disengaged from the latch member 508, and the springs 516, 516b are biased towards the actuator 404. Accordingly, the latch member 508 and the actuator 504 are spaced apart from and below the open end 86 of the cavity 70.

Prior to coupling the battery pack 54, the latching mechanism 500 is in the second position. The user then aligns the rails 56 of the battery pack 54 with the grooves 104 of the battery pack receiving portion 50, and slides the battery pack 54 along the longitudinal axis 58. Once the battery pack 54 is inserted into the cavity 70, the user moves the latching mechanism from the second position through the intermediate position to the first position. That is, the actuator 504, and therefore the latch member 508, are moved (e.g., pivoted) in a direction towards the battery pack 54 (e.g., in the direction of arrow 570) to position the finger 544 of the latch member 508 into the pocket 428 of the retaining plate 350 of the battery pack 54.

To release the battery pack 54, the user moves the latching mechanism 500 from the first position through the intermediate position to the second position. The user moves (e.g., pivots) the actuator 504 away from the battery pack 54 (e.g., in a direction opposite the arrow 570) to once again space the actuator 504 and the latch member 528 apart from the open end 86 of the cavity 70. With the actuator 504 and the latch member 508 spaced apart from the open end 86 of the cavity 70, the user can remove the battery pack 54 from the cavity 70 of the electric device 10.

Figure 21:
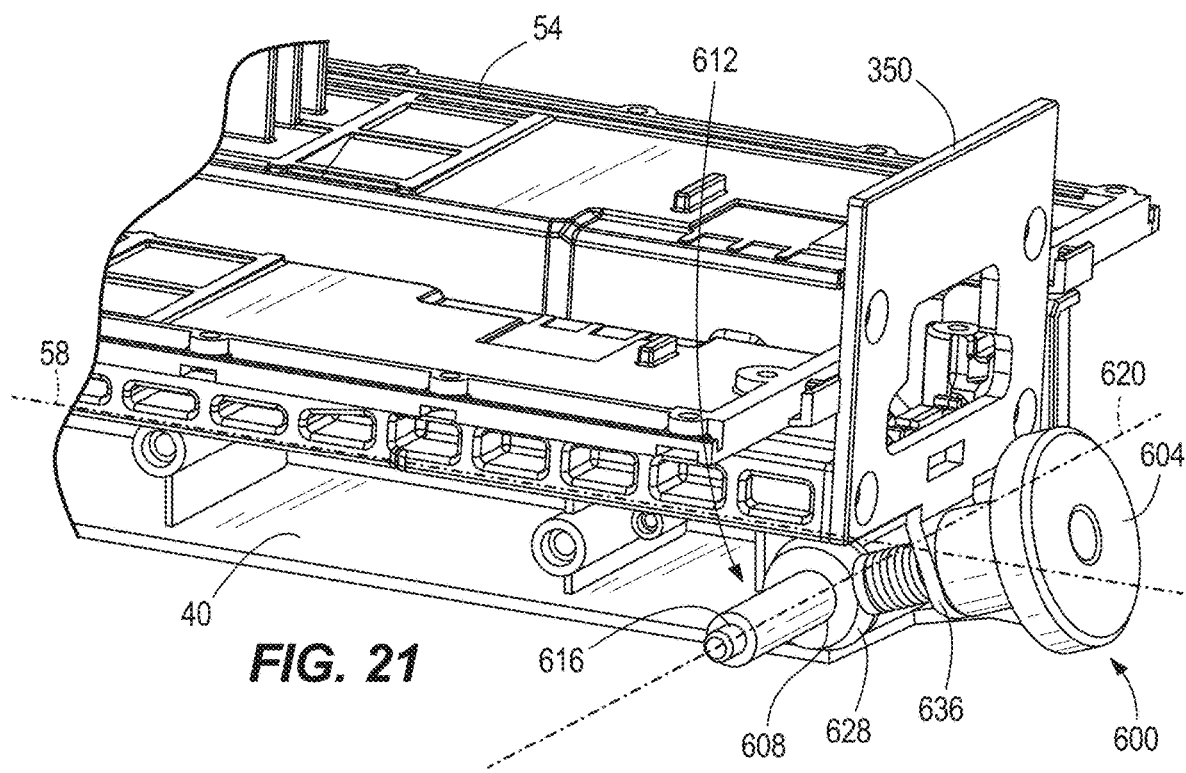
FIG. 21 is a perspective view of a portion of the housing of the electric device and a portion of a housing of the battery pack shown in FIGS. 1A and 1C, the electric device including a latching mechanism according to another embodiment.

FIG. 21 illustrates a latching mechanism 600 on the electric device 10 according to another embodiment. The latching mechanism 600 includes a handle or actuator 604, a threaded member 608, and a pivot mechanism 612. The pivot mechanism 612 includes a pin 616 that is positioned within the housing 40 and defines a pin axis 620 that is perpendicular to the longitudinal axis 58. The pin 616 is rotatable about the pin axis 620. The pin 616 is coupled to a first end of the threaded member 608 (e.g., by a collar 628), and therefore the threaded member 608 is pivotable about the longitudinal axis 620 of the pin 616. A second end of the threaded member 608 is threadably coupled to the actuator 604, which is a rotatable knob in this embodiment. The threaded member 608 on the pivot pin 616 allows the actuator 604 to pivot into and out of engagement with a hook 636 extending from the face plate 350 of the battery pack 54. To couple the battery pack 54 to the electric device 10, the threaded member 608 is positioned within the hook 636, and the actuator 604 is rotated to tighten (using the threaded coupling therebetween) the battery pack 54 into position. The actuator 604 may also include a torque limiting device (not shown). To release the battery pack 54 from the electric device 10, the actuator 604 is rotated to loosen the threaded member 608 from the hook 636, and the actuator 604 it moved or pivoted out of and away from the hook 636.

FIGS. 22-25 illustrate a latching mechanism 700 according to another embodiment. The latching mechanism 700 has components in both the electric device 10 and the battery pack 54.

Figure 22:
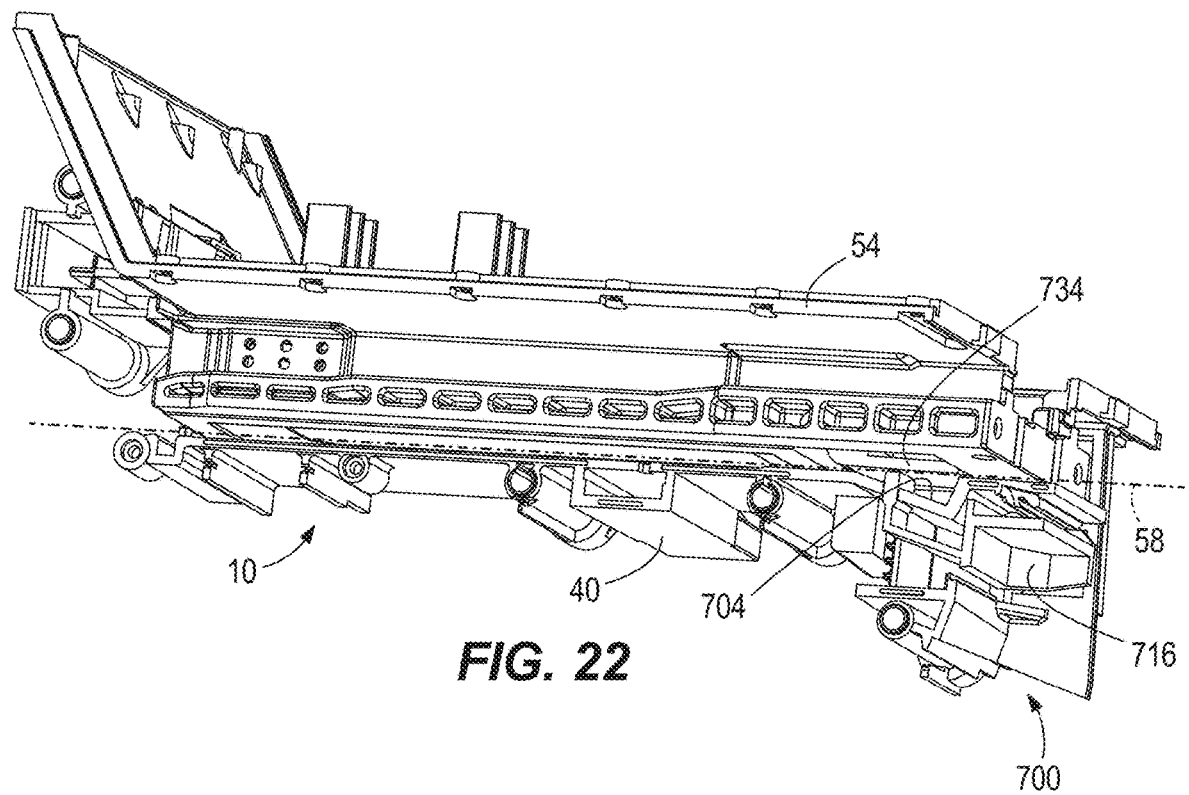
FIG. 22 a perspective view of a portion of the housing of the electric device and a portion of a housing of the battery pack shown in FIGS. 1A and 1C, the electric device including a latching mechanism according to another embodiment.
Figure 23:
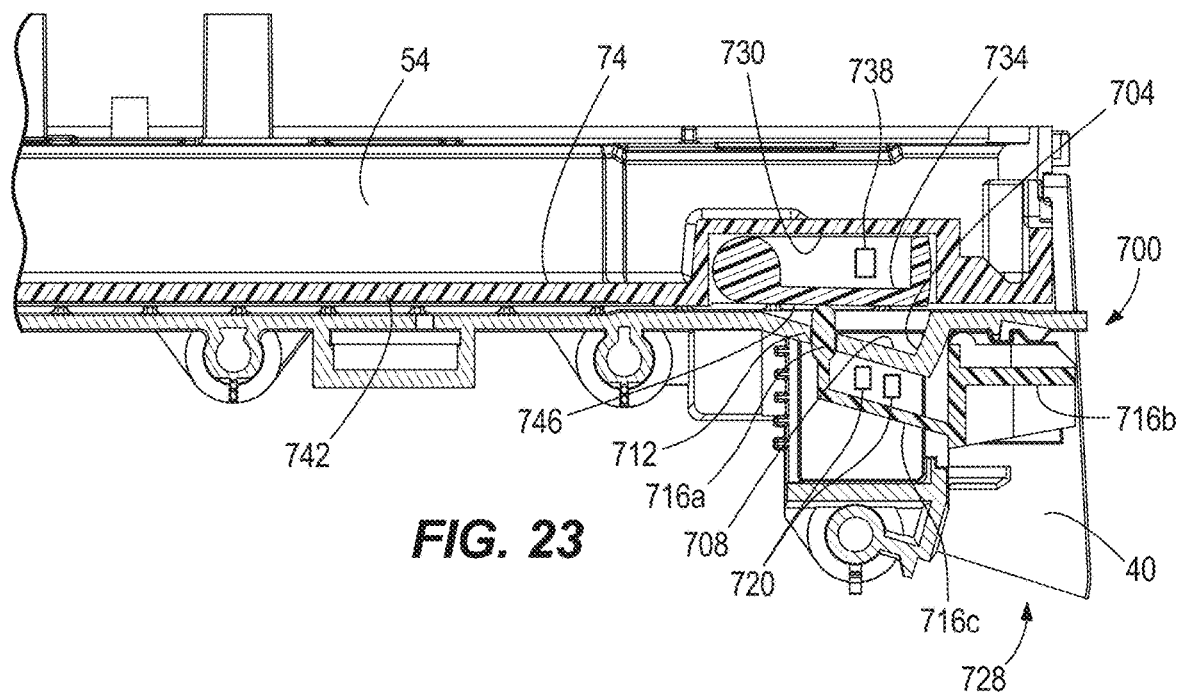
FIG. 23 is a cross-sectional view of the latching mechanism of FIG. 22 along a longitudinal axis of the battery receiving portion of FIG. 22.
Figure 24:
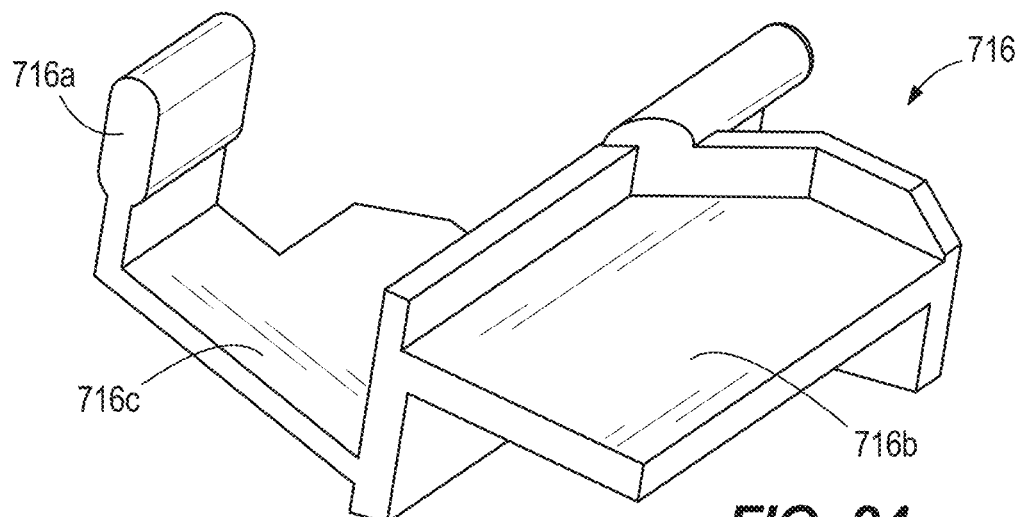
FIG. 24 is a perspective view of an actuator of the latching mechanism of FIG. 22.
Figure 25:
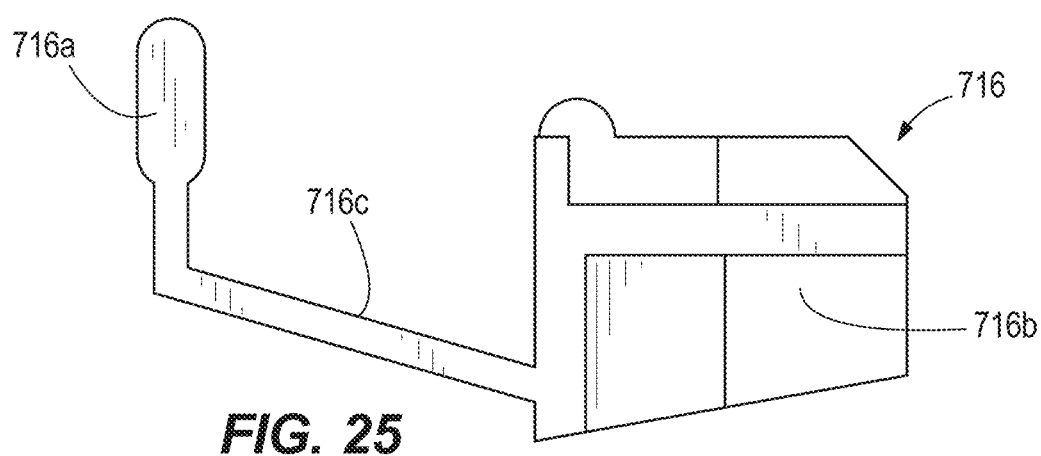
FIG. 25 is a side view of the actuator of the latching mechanism of FIG. 22.
Figure 26:
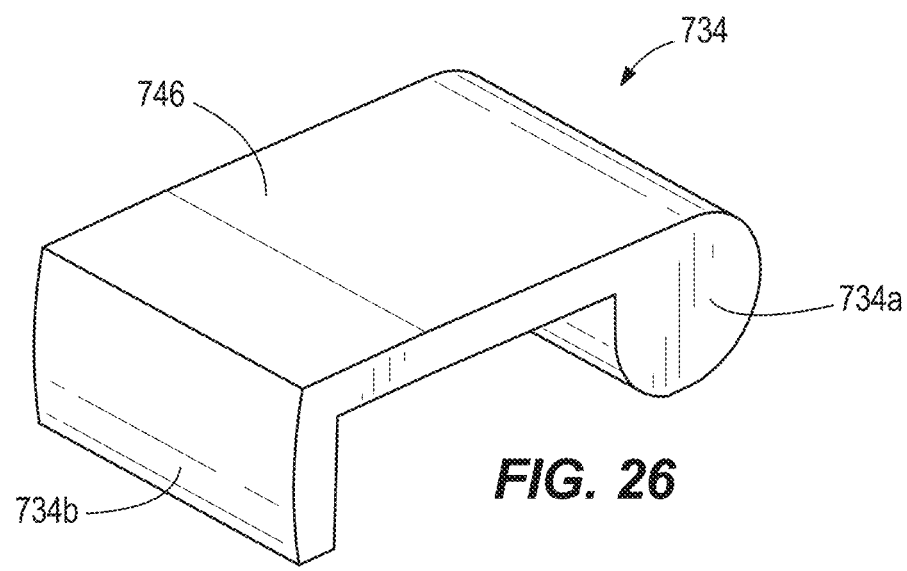
FIG. 26 is a perspective view of a latching member of the latching mechanism of FIG. 22.

In the embodiment illustrated in FIGS. 22-25, the housing 40 of the electric device 10 includes a bore 704 having an angled or ramped surface 708. An opening 712 extends through the angled surface 708. The housing 40 further includes an actuator 716 that is positioned within and movable relative to the housing 40. The actuator 716 includes a first portion 716a that extends through the opening 712 in the angled surface 708 and a second end 716b that extends from the housing 40. The first and second portions 716a, 716b are connected by a central portion 716c. In the illustrated embodiment, the central portion 716c is angled relative to both the first and second portions 716a, 716b and is configured to be parallel to the angled surface 708 of the bore 704. Additionally, one or more biasing members 720 (e.g., springs) are positioned between the angled surface 708 of the housing 40 and the angled surface 716c of the actuator 716. The actuator 716 is moveable between a first position (not shown) and a second position (FIGS. 21 and 22). In the first position, the springs 720 bias the angled surface 716c of the actuator 716 away from the angled surface 708 of the bore 704 such that the first portion 716a of the actuator 716 is positioned within the housing 40. In the second position (FIGS. 21 and 22), a force is exerted by a user on the second portion 716b of the actuator 716. The force is exemplified by arrow 728 in FIG. 23. Because of the force 728 on the second portion 716b of the actuator 716, the springs 720 are compressed such that the first portion 716a extends into the bore 704 in the housing 40. When in the second position, a distal end of the first portion 716a is substantially aligned with the lower surface 74 of the cavity 70.

Further with respect to FIGS. 22-25, the housing of the battery pack 54 also includes a bore 730 that receives a latch member 734 of the latching mechanism 700. In particular, the latch member 734 includes a first end 734a, which is pivotably coupled to the housing of the battery pack 54 (e.g., by a pin or the like) adjacent a first end of the bore 730, and a second end 734b that is opposite the first end 734a. One or more compression springs 738 are positioned between the bore 730 and the latch member 734. The latch member 734 is movable between a first position (not shown) and a second position (FIGS. 21 and 22). In the first position, the spring 738 biases the latch member 734 away from the bore 730 such that the latch member 734 extends from a surface 742 of the housing of the battery pack 54. When in the first position, the latch member 734 extends from the surface 742 of the housing of the battery pack 54 at an angle. In the second position (FIGS. 21 and 22), the latch member 734 is positioned in the bore 730 of the battery pack 54 such that the surface 746 of the latch member 734 is coincident with the surface 742 of the housing of the battery pack 54.

When the battery pack 54 is coupled to the electric device 10, both the actuator 716 and the latching mechanism 730 are in the first position. That is, the first portion 716a of the actuator 716 is positioned within the housing 40 such that the bore 704 is open. Accordingly, the springs 738 bias the latch member 734 away from the battery pack 54 and into the bore 704 of the electric device 10. To remove the battery pack 54 from the electric device 10, both the actuator 716 and the latching mechanism 730 must be moved from the first position to the second position. Accordingly, the force 728 is applied to the second portion 716b of the actuator 716 to move the actuator 716 toward the battery pack 54. Accordingly, the actuator 716 moves against the bias of the springs 720 such that the first portion 716a of the actuator 716 moves into bore 704 thereby engaging the latch member 734 positioned therein. In turn, as force is applied to the actuator 716, the first portion 716a of the actuator 716 overcomes the bias of the springs 738 in the battery pack 54 to move the latch member 734 into the bore 730 of battery pack 54. Once both the actuator 716 and the latch member 734 have achieved the second positions, the battery pack 54 can be removed from the electric device. When the user releases the force 728 from the actuator 716, the actuator 716 and the latching mechanism 730 will be biased back to the first position by bias of the respective spring 720, 738.

Although the invention has been described in detail with reference to certain preferred embodiments, variations and modifications exist within the scope and spirit of one or more independent aspects of the invention as described.

What is claimed is:

1. A power tool comprising:
    a housing including a battery pack receiving portion configured to receive an interface of a battery pack;
    device contacts extending from the housing and configured to mechanically and electrically engage with the battery pack;
    a latching mechanism including:
        an actuator pivotably coupled to the housing about a first pivot axis, and
        a latch member pivotably coupled to the housing about a second pivot axis, the latch member configured to selectively engage the interface of the battery pack, wherein the actuator is configured to pivot about the first pivot axis to selectively pivot the latch member about the second pivot axis; and
    a lock movably coupled to the actuator and configured to prevent the actuator from pivoting about the first pivot axis.

2. The power tool of claim 1, wherein the latching mechanism is movable between a latched position in which the actuator does not engage the latch member and the latch member projects into the battery pack receiving portion, and a released position in which the actuator engages the latch member and the latch member is positioned within the housing.

3. The power tool of claim 2, wherein, when a force is exerted on the actuator in a first direction, the actuator pivots about the first pivot axis and exerts a force on the latch member in a second direction to pivot the latch member about the second pivot axis, thereby moving the latch member from the latched position to the released position, and
    wherein a biasing mechanism automatically moves the latch member from the released position to the latched position when the force on the actuator is removed.

4. The power tool of claim 2, wherein the lock is movable between a locked position in which the actuator is prevented from moving from the latched position to the released position, and an unlocked position in which the actuator is permitted to move from the latched position to the released position.

5. The power tool of claim 4, wherein the lock is maintained in the locked position by a biasing mechanism.

6. The power tool of claim 1, wherein the lock engages a surface of the housing to prevent the actuator from pivoting about the first axis.

7. The power tool of claim 1, wherein the actuator includes a first end accessible from an outside of the housing and a second end opposite the first end, the second end being positioned within the housing, the first pivot axis being positioned between the first end and the second end and the lock being positioned adjacent to the first end.

8. A power tool comprising:
a housing including a battery pack receiving portion configured to receive an interface of a battery pack;
device contacts extending from the housing and configured to mechanically and electrically engage with the battery pack;
a latching mechanism supported by the housing and including an actuator and a latch member, the latching mechanism configured to selectively engage the interface of the battery pack, the actuator being pivotable to operatively pivot the latch member; and
a lock movably coupled to the actuator and configured to prevent the actuator from pivoting to operatively pivot the latch member.

9. The power tool of claim 8, wherein the actuator includes a first end accessible from an outside of the housing and a second end opposite the first end, the second end being positioned within the housing, the actuator defining a first pivot axis between the first end and the second end and the lock being positioned adjacent to the first end.

10. The power tool of claim 9, wherein the latch member includes a body that is configured to selectively project into the battery pack receiving portion and an opening that has a ledge, the opening configured to receive the second end of the actuator, the latch member defining a second pivot axis.

11. The power tool of claim 10, wherein the latching mechanism is movable between a latched position in which the actuator does not engage the ledge of the latch member and at least a portion of the body of the latch member projects into the battery pack receiving portion, and a released position in which the actuator engages the ledge of the latch member and the body of the latch member is positioned within the housing.

12. The power tool of claim 11, wherein, when a force is exerted on the first end of the actuator in a first direction, the actuator pivots about the first pivot axis and exerts a force on the ledge of the latch member in a second direction to pivot the latch member about the second pivot axis thereby moving the latch member from the latched position to the released position, and wherein a biasing mechanism automatically moves the latch member from the released position to the latched position when the force on the actuator is removed.

13. The power tool of claim 11, wherein the lock is movable between a locked position in which the actuator is prevented from moving from the latched position to the released position and an unlocked position in which the actuator is permitted to move from the latched position to the released position.

14. The power tool of claim 13, wherein the lock is maintained in the locked position by a biasing mechanism.

15. The power tool of claim 8, wherein the lock engages a surface of the housing to prevent the actuator from pivoting to operatively pivot the latch member.

16. A power tool comprising:
a housing including a cavity configured to receive an interface of a battery pack, the cavity defined by a lower surface, a pair of sidewalls, and an end wall,
a rail disposed on each side wall;
device contacts supported on the end wall and configured to mechanically and electrically engage with the battery pack;
a latching mechanism supported by the housing and including an actuator and a latch member configured to selectively engage the interface of the battery pack, the actuator being pivotable to operatively pivot the latch member; and
a lock movably coupled to the actuator and configured to prevent the actuator from pivoting to operatively pivot the latch member.

17. The power tool of claim 16, wherein the actuator includes a first end accessible from an outside of the housing and a second end opposite the first end, the second end being positioned within the housing, the lock being positioned adjacent to the first end.

18. The power tool of claim 16, wherein the actuator includes a first end accessible from an outside of the housing and a second end opposite the first end, the second end being positioned within the housing; and
wherein the actuator defines a first pivot axis between the first end, the lock is positioned adjacent to the first end, and the lock is pivotable about a second pivot axis that is perpendicular to the first pivot axis.

19. The power tool of claim 16, wherein, in a locked position, the lock engages a surface of the housing to prevent the actuator from pivoting about a first axis, and, in an unlocked position, the lock is spaced apart from the housing such that the lock does not prevent the actuator from pivoting about the first axis.

20. The power tool of claim 19, further comprising:
a biasing mechanism configured to maintain the lock in the locked position.

* * * * *